(12) United States Patent
Oka et al.

(10) Patent No.: US 7,524,268 B2
(45) Date of Patent: Apr. 28, 2009

(54) DRIVE CONTROL APPARATUS FOR FORKLIFT

(75) Inventors: Hidenori Oka, Kariya (JP); Tadashi Yamada, Kariya (JP); Toshikazu Kamiya, Kariya (JP); Masayuki Takahashi, Kariya (JP); Kimihide Hasegawa, Kariya (JP); Hirokazu Kobayashi, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 398 days.

(21) Appl. No.: 11/541,290

(22) Filed: Sep. 29, 2006

(65) Prior Publication Data

US 2007/0084450 A1  Apr. 19, 2007

(30) Foreign Application Priority Data

Sep. 30, 2005  (JP) .............................. 2005-288242
Jul. 10, 2006  (JP) .............................. 2006-189462

(51) Int. Cl.
*F16H 45/02* (2006.01)

(52) U.S. Cl. ................... 477/169; 477/171; 477/172; 477/173; 477/175; 701/50

(58) Field of Classification Search ................ None
See application file for complete search history.

(56) References Cited

U.S. PATENT DOCUMENTS 4,231,450 A * 11/1980 Hedtke et al. ............... 187/222
6,050,770 A *  4/2000 Avitan ........................ 414/636
6,175,796 B1 *  1/2001 Ishikawa ..................... 701/50
7,165,652 B2 *  1/2007 Allerding et al. ............ 187/224
7,216,024 B1    5/2007 Abels et al.
2004/0154871 A1   8/2004 Allerding et al.

FOREIGN PATENT DOCUMENTS

| DE | 100 10 011 A1 | 2/2001 |
| EP | 0 921 021 A2 | 6/1999 |
| EP | 0 921 021 A3 | 2/2005 |
| GB | 2 412 902 A | 10/2005 |
| JP | 9-24751 | 1/1997 |
| JP | 2001-31391 | 2/2001 |
| JP | 2001-163597 | 6/2001 |

OTHER PUBLICATIONS

U.S. Appl. No. 11/541,183, filed Sep. 29, 2006, Oka et al.
U.S. Appl. No. 11/541,075, filed Sep. 29, 2006, Yamada et al.
European Search Report dated Sep. 12, 2008 issued by European Patent Office for application No. 06121452.4-2316/1770052.

* cited by examiner

*Primary Examiner*—David D. Le
(74) *Attorney, Agent, or Firm*—Locke Lord Bissell & Liddell, LLP

(57) ABSTRACT

A load determining section of a drive control apparatus for forklift determines a load state related to a loading attachment. In a case where a connection determining section determines switching to a connection state, if the load state determined by the load determining section requires that driving of a vehicle body be limited, a disconnection control section forcibly disconnects a transmission of a driving force to a drive wheel. Thus, the forklift is prevented from being started in a state that is likely to make the driving of the forklift unstable.

21 Claims, 15 Drawing Sheets

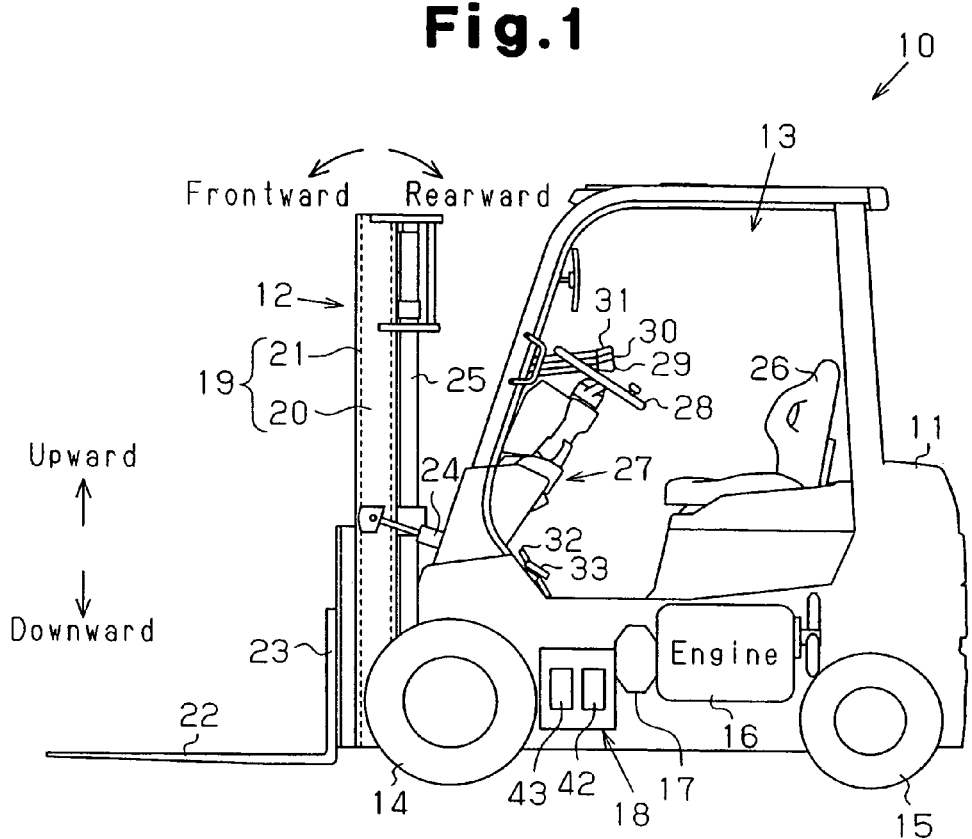
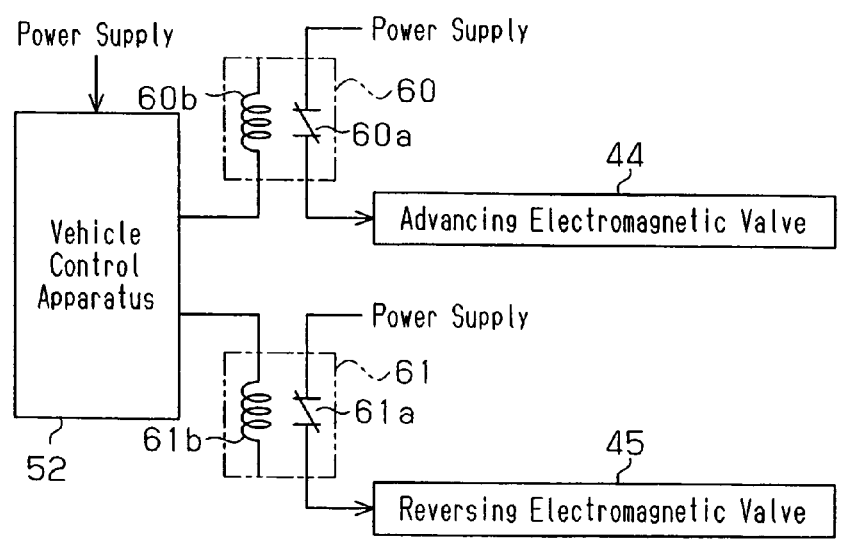

Depression Amount of Accelerator Pedal 32

Depression Amount of Inching Pedal

Engine Speed (rotation/mimute)

Vehicle Speed (km/h)

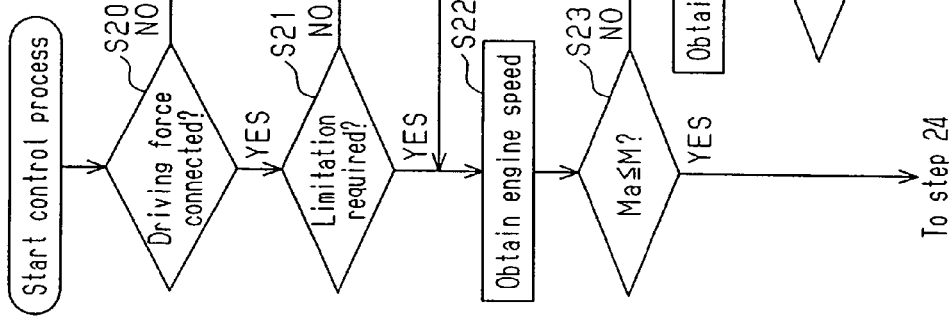
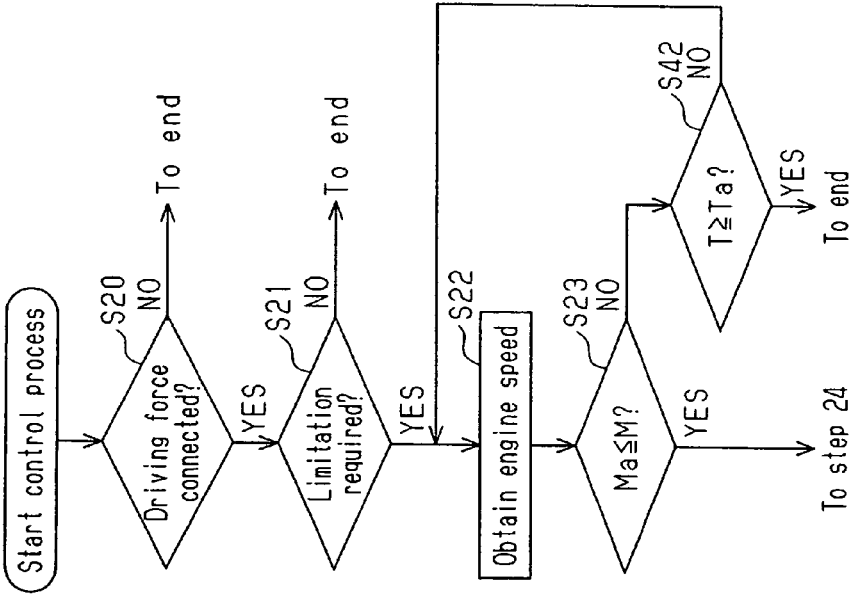

DRIVE CONTROL APPARATUS FOR FORKLIFT

BACKGROUND OF THE INVENTION

The present invention relates to a drive control apparatus for controlling driving of a forklift.

Conventionally, forklifts are widely used as industrial vehicles for handling loads (picking up and placing of loads) in plants. Due to its characteristic usage, the driving stability of this type of forklift greatly varies depending on the load state. For example, the center of gravity of the vehicle is shifted and the driving stability varies between a state of carrying no loads and a state of carrying a load. When carrying a load, the driving stability varies depending on the weight of the load, the height of the fork on which the load is mounted, the tilt angle of the fork. Thus, conventionally, a technique for limiting the driving of a forklift in accordance with the load state to improve the driving stability of the vehicle is disclosed in Japanese Laid-Open Patent Publication No. 2001-163597. In the publication No. 2001-163597, the minimum value of acceleration that causes rear wheels to be raised off the ground surface when the vehicle is traveling rearward is computed based on the load state and is set as a permissible acceleration. The actual acceleration of the vehicle is limited not to surpass the permissible acceleration.

Japanese Laid-Open Patent Publication No. 9-24751 discloses a technique for stabilizing the driving of vehicles such as rice transplanters, combine harvesters, and tractors. Japanese Laid-Open Patent Publication No. 9-24751 proposes a technique in which, when a rice transplanter finishes transplantation of rice seedling and starts driving on a road, the engine speed is lowered to a predetermined engine speed upon switching of main clutch from a disengaged state to an engaged state.

The technique disclosed in Japanese Laid-Open Patent Publication No. 2001-163597 is based on the fact that a vehicle becomes unstable during acceleration, and limits the degree of acceleration. In a sudden acceleration of a vehicle, the technique for limiting acceleration according to the publication No. 2001-163597 may not be able to prevent the vehicle from being unstable. That is, in a state where the clutch, which transmits power of the engine, or a driving source, to drive wheels, and in a state where a direction lever for instructing the traveling direction of the vehicle is in a neutral position, if the accelerator pedal is operated, the engine speed is revved up without accelerating the vehicle. In this state, if the clutch is engaged or the direction lever is put in a driving position, the acceleration is abruptly changed and the vehicle is suddenly accelerated. Therefore, in the acceleration control disclosed in Japanese Laid-Open Patent Publication No. 2001-163597, the engine control is not timely performed to deal with such an abrupt change in acceleration. As a result, the vehicle is abruptly started, which is likely to cause the driving of the vehicle at the start to be unstable.

In contract, in Japanese Laid-Open Patent Publication No. 9-24751, the engine speed is temporarily reduced when the main clutch is switched from the disengaged state to the engaged state, so that an abrupt start is suppressed. However, in an industrial vehicle that carries a load such as a forklift, the driving stability of the vehicle varies depending on the load state. Thus, even if the control disclosed in Japanese Laid-Open Patent Publication No. 9-24751 is applied to a forklift, the driving stability at the start is not fully ensured. That is, even if the control in which the engine speed is reduced to a predetermined speed at the time of engagement of the clutch is performed, the engagement of the clutch permits the driving force to be transmitted to the drive wheels. The vehicle travels accordingly. Therefore, in a forklift, in which the driving stability varies according to the load state, the stability may be ensured even if it takes a certain period of time for the engine speed to be lowered in a case where a load is carried at a relatively low position. However, in a case of harsher loading condition, for example, when a load is held at a relatively high position, the stability may not be ensured. As a result, depending on the load state, the reduction of the engine speed cannot be performed sufficiently early (engine control is not sufficiently early). This makes the driving at the start unstable.

SUMMARY OF THE INVENTION

Accordingly, it is an objective of the present invention to provide a drive control apparatus for a forklift that prevents the forklift from being started in a state that is likely to make the driving of the forklift unstable.

To achieve the foregoing objective and in accordance with one aspect of the present invention, a drive control apparatus for a forklift is provided. The forklift includes a vehicle body, a drive wheel provided to the vehicle body, an engine, a power transmission mechanism interposed between the engine and the drive wheel, and a loading attachment that is provided at a front portion of the vehicle body and mounts a load. The power transmission mechanism is switchable between a connection state for transmitting power of the engine to the drive wheel and a disconnection state for not transmitting the power of the engine to the drive wheel. The forklift travels using the power of the engine as a driving force. The drive control apparatus includes a connection determining section, a load determining section, and a disconnection control section. The connection determining section determines whether the power transmission mechanism is switched from the disconnection state to the connection state in response to an operation by a driver. The load determining section determines a load state related to the loading attachment. In a case where the connection determining section determines switching to the connection state, if the load state determined by the load determining section requires that the driving of the vehicle body be limited, the disconnection control section forcibly disconnects the transmission of the driving force to the drive wheel.

In accordance with another aspect of the present invention, a drive control apparatus for a forklift is provided. The forklift includes a vehicle body, a drive wheel provided to the vehicle body, an engine, a power transmission mechanism interposed between the engine and the drive wheel, and a loading attachment that is provided at a front portion of the vehicle body and mounts a load. The power transmission mechanism is switchable between a connection state for transmitting power of the engine to the drive wheel and a disconnection state for not transmitting the power of the engine to the drive wheel. The forklift travels using the power of the engine as a driving force. The drive control apparatus includes a connection determining section, an engine speed determining section, and a disconnection control section. The connection determining section determines whether the power transmission mechanism is switched from the disconnection state to the connection state in response to an operation by a driver. The engine speed determining section determines an engine speed. A limitation engine speed is set higher than at least an idle speed of the engine. In a case where the connection determining section determines switching to the connection state, if the engine speed determined by the engine speed determining section is equal to or greater than the limitation engine speed, the disconnection control section forcibly disconnects the transmission of the driving force to the drive wheel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a side view illustrating a forklift;

FIG. 2 is a diagram showing a relay circuit for advancing and relay circuit for reversing, which are located between a vehicle control apparatus and an electromagnetic valve for advancing and between the vehicle control apparatus and an electromagnetic valve for reversing, respectively;

FIG. 15 is a flowchart showing a start control process according to a fourth embodiment;

FIG. 16 is a flowchart showing a start control process according to a fifth embodiment;

DETAILED DESCRIPTION OF THE PREFERRED EMBODIMENTS

Figure 3:
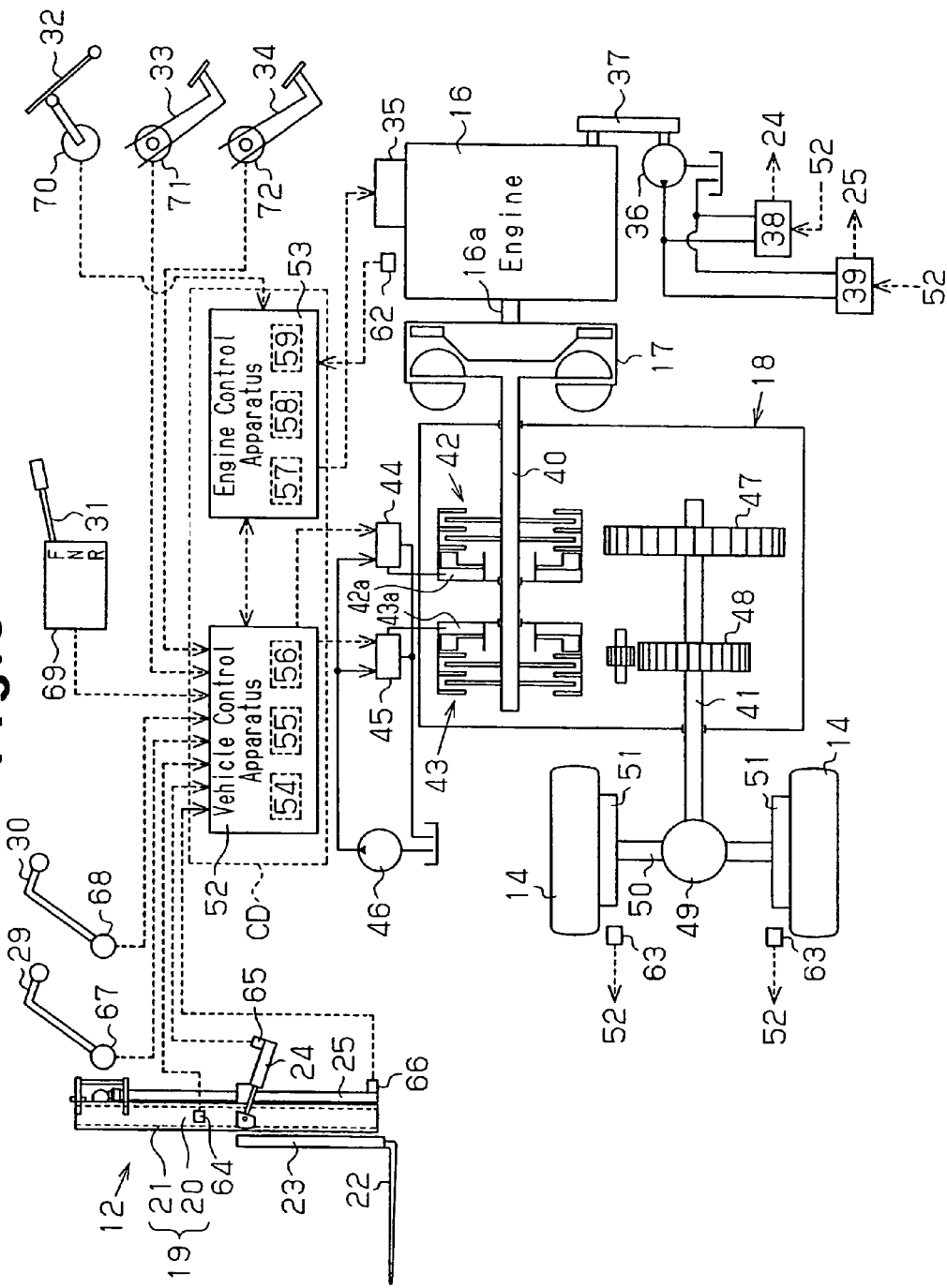
FIG. 3 is a diagrammatic view showing the forklift.

A drive control apparatus CD for use in a forklift 10 according to a first embodiment of the present invention will now be described with reference to FIGS. 1 to 9. In the following, the direction in which a driver of the forklift 10 is defined as a forward direction. The backward, upward, downward, leftward, and rightward directions are defined with reference to the forward direction.

FIG. 1 is a side view of the forklift 10. As shown in FIG. 1, the forklift 10 includes a loading device 12 at a front portion of a vehicle body 11. A cab 13 is formed in a center portion of the vehicle body 11. Drive wheels (front wheels) 14 are located in front and lower portions of the vehicle body 11, and steered wheels 15 are provided in rear and lower portions of the vehicle body 11. The vehicle body 11 also mounts a transmission 18 having a torque converter 17. The torque converter 17 forms a power transmission mechanism. An engine 16 is coupled to the drive wheels 14 by way of the transmission 18 having the torque converter 17. The transmission 18 is located between the drive wheels 14 and the engine 16. The forklift 10 of this embodiment is an engine type (engine vehicle), in which the drive wheels 14 are driven by the engine 16. That is, the forklift 10 travels by using the power of the engine 16.

The loading device 12 will now be described. A multistage (two-stage in this embodiment) mast assembly 19 is provided at a front portion of the vehicle body 11. The mast assembly 19 includes a pair of left and right outer masts 20 and a pair of left and right inner masts 21. A pair of left and right forks (loading attachment) are attached to the mast assembly 19 by means of a lift bracket 23. A hydraulic tilt cylinder 24 is coupled to each outer mast 20 to tilt the mast assembly 19 (the forks 22) frontward and rearward of the vehicle body 11. A hydraulic lift cylinder 25 is coupled to each inner mast 21. The lift cylinders 25 lift and lower the forks 22 with respect to the vehicle body.

A driver's seat 26, on which a driver is seated, is provided in the cab 13. Also, an instrument panel 27 is provided in a front portion of the cab 13. On the instrument panel 27, steering wheel 28, a lift lever 29, a tilt lever 30, and a drive instructing section, which is an advance/reverse lever (direction lever) 31 are provided. The steering wheel 28 is used for changing the steered angle of the steered wheels 15. The lift lever 29 is operated for lifting or lowering the forks 22, and the tilt lever 30 is operated for tilting the mast assembly 19. When the lift lever 29 is operated, the lift cylinders 25 are actuated in accordance with the direction of the operation (lifting direction or lowering direction), so that the inner masts 21 are slid along the outer masts 20. Accordingly, the forks 22 are lifted or lowered. When the tilt lever 30 is operated, the tilt cylinders 24 are actuated (extended or retracted) in accordance with the direction of the operation (forward tilting direction or rearward tilting direction), so that the mast assembly 19 is tilted with the forks 22. The advance/reverse lever 31 is operated for instructing the traveling direction of the vehicle (in this embodiment, advancing direction or reversing direction).

On the floor of the cab 13, a vehicle acceleration section, which is an accelerator pedal 32, an inching operation section, which is an inching pedal 33, and a braking operation section, which is a brake pedal 34, are provided. FIG. 1 shows the accelerator pedal 32 and the inching pedal 33. FIG. 3 shows the brake pedal 34. The accelerator pedal 32 is operated for instructing acceleration (driving) of the vehicle. The inching pedal 33 is operated for partially engaging the clutches of the transmission 18 (an advancing clutch 42 and a reversing clutch 43) when manually operating the vehicle to slowly travel during loading. The engagement state of the clutches (the advancing clutch 42 and the reversing clutch 43) is continuously changed between engagement and disengagement by means of the inching pedal 33. The brake pedal 34 is operated for applying braking force to the vehicle. When operated, the brake pedal 34 is operated independently from the inching pedal 33. On the other hand, when operated over halfway, the inching pedal 33 starts being interlocked with the brake pedal 34. That is, the inching pedal 33 is operated independently from the brake pedal 34 (non-interlocking) in an inching region, and interlocked with the brake pedal 34 outside of the inching region (braking region). The inching region refers to a region in which the inching pedal 33 is depressed and the clutch (the advancing clutch 42 or the reversing clutch 43) is partially engaged. The braking region is a region in which braking force is applied to the vehicle.

FIG. 3 is a diagrammatic view showing the forklift 10 of the present embodiment.

An output shaft 16a of the engine 16 is coupled to the transmission 18 with the torque converter 17. The engine 16 is provided with a throttle actuator 35. The throttle actuator 35 is actuated to adjust the opening degree of a throttle valve. Accordingly, the speed of the engine 16, that is, the speed of the output shaft 16a, is adjusted. The engine 16 is also connected to a loading pump, which is a hydraulic pump 36, with a speed increasing gear 37. The hydraulic pump 36 is driven by the engine 16. In the forklift 10 of the present embodiment, the power of the engine 16 is used for traveling the vehicle and for actuating the loading device 12 (the tilt cylinders 24 and the lift cylinders 25). The discharge side of the hydraulic pump 36 is connected to the tilt cylinders 24 for tilting the mast assembly 19 (the forks 22) and the lift cylinders 25 for lifting and lowering the forks 22. The tilt cylinders 24 are connected to the hydraulic pump 36 with pipes and a fork tilting electromagnetic control valve 38, while the lift cylinders 25 are connected to the hydraulic pump with pipes and a fork lifting/lowering electromagnetic control valve 39.

The transmission 18 has an input shaft (main shaft) 40 and an output shaft (counter shaft) 41. The input shaft 40 is connected to the advancing clutch 42 and the reversing clutch 43. The advancing clutch 42 and the reversing clutch 43 are hydraulic clutches (in this embodiment, wet multi-disc clutches). The advancing clutch 42 and the reversing clutch 43 have a pressure receiving chamber 42a, 43a, respectively. The engagement force of each clutch 42, 43 is adjusted by the hydraulic pressure in the corresponding pressure receiving chamber 42a, 43a (hereinafter, referred to as clutch pressure). When the clutch pressure is increased, the engagement force is reduced.

The advancing clutch 42 is connected to an advancing electromagnetic valve 44, and the reversing clutch 43 is connected to a reversing electromagnetic valve 45. The electromagnetic valves 44, 45 are connected to a hydraulic pump 46 with pipes. The hydraulic pump 46 is driven by the rotational force transmitted to the transmission 18 when the engine 16 is running (rotational force of the input shaft 40 of the transmission 18). The pressure receiving chamber 42a of the advancing clutch 42 is supplied with hydraulic oil through the advancing electromagnetic valve 44 by the actuation of the hydraulic pump 46. Likewise, the pressure receiving chamber 43a of the reversing clutch 43 is supplied with hydraulic oil through the reversing electromagnetic valve 45 by the actuation of the hydraulic pump 46. In this embodiment, the advancing electromagnetic valve 44 and the reversing electromagnetic valve 45 are fully open when the current to the solenoid is zero, and are fully closed when a current is supplied to the solenoid. When currents to the solenoids of the electromagnetic valves 44, 45 become zero, hydraulic oil is supplied to the pressure receiving chambers 42a, 43a, and the advancing clutch 42 and the reversing clutch 43 are disengaged. When currents are supplied to the solenoids of the electromagnetic valves 44, 45, no hydraulic oil is supplied to the pressure receiving chambers 42a, 43a, and the advancing clutch 42 and the reversing clutch 43 are engaged.

An advance gear train 47 and a reverse gear train 48 are attached to the output shaft 41 of the transmission 18. The gear trains 47, 48 transmit rotation of the input shaft 40 to the output shaft 41. The output shaft 41 of the transmission 18 is coupled to an axle 50 with a differential 49. The drive wheels 14 are proved at ends of the axle 50. The power of the engine 16 is transmitted to the axle 50 through the output shaft 41 of the transmission 18, and the drive wheels 14 are rotated in a direction corresponding to the rotating direction of the output shaft 41. A hydraulic drum brake 51 is provided at each drive wheel 14.

Although the torque converter 17, the transmission 18, the advancing electromagnetic valve 44, the reversing electromagnetic valve 45, the hydraulic pump 46 are each depicted independently in FIG. 3, these components are accommodated in a single housing.

The vehicle body 11 mounts a vehicle control apparatus 52 and an engine control apparatus 53. In this embodiment, the vehicle control apparatus 52 and the engine control apparatus 53 form the drive control apparatus CD (depicted by a broken line in FIG. 3) for controlling the driving of the forklift 10. The vehicle control apparatus 52 and the engine control apparatus 53 are connected to each other such that electrical signals can be sent between the apparatuses 52, 53. The vehicle control apparatus 52 and the engine control apparatus 53 may be connected with wires or wirelessly connected. The vehicle control apparatus 52 has a central processing unit (CPU) 54 for controlling the vehicle, a random access memory 55 for controlling the vehicle, and an input-output interface 56. The memory 55 stores control programs for controlling driving and loading of the forklift 10. The memory 55 also stores map data for controlling driving and loading of the forklift 10 (shown in FIGS. 4, 5, and 6). The engine control apparatus 53 has a central processing unit (CPU) 57 for controlling the engine 16, a random access memory 58 for controlling the engine 16, and an input-output interface 59. The memory 58 stores control programs for controlling the engine 16. The memory 58 also stores map data for controlling the engine 16 (shown in FIG. 10). The vehicle control apparatus 52 inputs detection signals from various types of sensors and various types of signals from the engine control apparatus 53, and controls the driving and loading of the forklift 10. The engine control apparatus 53 inputs detection signals from various types of sensors and various types of signals from the vehicle control apparatus 52, and controls the engine 16.

The vehicle control apparatus 52 is connected to the advancing electromagnetic valve 44 through an advancing relay circuit 60 as shown in FIG. 2, and to the reversing electromagnetic valve 45 through a reversing relay circuit 61. The advancing relay circuit 60 is formed by an advancing normally-closed contact (contact b) 60a and an advancing relay coil (electromagnet) 60b. The advancing electromagnetic valve 44 is energized by demagnetizing the advancing relay coil 60b and closing the advancing normally-closed contact 60a. The reversing relay circuit 61 is formed by a reversing normally-closed contact (contact b) 61a and a reversing relay coil (electromagnet) 61b. The reversing electromagnetic valve 45 is energized by demagnetizing the reversing relay coil 61b and closing the reversing normally-closed contact 61a.

Hereafter, various sensors mounted on the forklift 10 and connection of the sensors (to what the sensors are connected) will be described.

An engine speed sensor 62 for detecting the speed of the engine 16 is provided at the engine 16. The engine speed sensor 62 is connected to the engine control apparatus 53 and outputs a detection signal (engine speed signal) corresponding to the engine speed. Vehicle speed sensors 63 for detecting the vehicle speed of the forklift 10 are provided at positions of the vehicle body 11 that correspond to the drive wheels 14. The vehicle speed sensors 63 are connected to the engine control apparatus 53 and each output a detection signal (vehicle speed signal) corresponding to the vehicle speed. The detection signals of the engine speed sensor 62 and the vehicle speed sensors 63 are sent to the vehicle control apparatus 52 form the engine control apparatus 53.

A height sensor 64 for detecting the height of the forks 22 is provided in the mast assembly 19. The height sensor 64 is connected to the vehicle control apparatus 52. When the forks 22 reach a predetermined height H (for example, 2200 mm), the height sensor 64 outputs a detection signal (height signal). The height sensor 64 is formed, for example, by a limit switch. In this embodiment, the single height sensor 64 is provided in the mast assembly 19. A range equal to or higher than the height H detected by the height sensor 64 is defined as a high height range, and a range lower than the height H is defined as a low height range.

A tilt angle sensor 65 for detecting the tilt angle is attached to one of the tilt cylinders 24. The tilt angle sensor 65 is connected to the vehicle control apparatus 52 and detects an inclination angle of the forks 22 with respect to the angle of the forks 22 at a horizontal position (horizontal angle). The tilt angle sensor 65 outputs a detection signal (tilt angle signal) that corresponds to the inclination angle. The tilt angle sensor 65 is formed, for example, by a potentiometer. A load weight sensor 66 for detecting the weight of a load on the forks 22 is attached to one of the lift cylinders 25. The load weight sensor 66 is connected to the vehicle control apparatus 52 and detects the hydraulic pressure in the lift cylinder 25. The load weight sensor 66 outputs a detection signal (load signal) that corresponds to the weight of the load on the forks 22. The load weight sensor 66 is formed, for example, by a pressure sensor.

A lift lever sensor 67 for detecting the moved amount of the lift lever 29 is attached to the lift lever 29. A tilt lever sensor 68 for detecting the moved amount of the tilt lever 30 is attached to the tilt lever 30. The lift lever sensor 67 and the tilt lever sensor 68 are connected to the vehicle control apparatus 52, and output detection signals (lift manipulation signal and tilt manipulation signal) that correspond to the moved amounts of the lift lever 29 and the tilt lever 30. A shift switch 69 for detecting the position of the advance/reverse lever 31 (advance position [F], neutral position [N], reverse position [R]) is attached to the advance/reverse lever 31. The shift switch 69 is connected to the vehicle control apparatus 52 and outputs a detection signal (advance/reverse signal) that corresponds to the position of the advance/reverse lever 31. In this embodiment, when the advance/reverse lever 31 is at the advance position [F] or the reverse position [R], the shift switch 69 outputs a signal corresponding to the position. When the advance/reverse lever 31 is at the neutral position [N], the shift switch 69 outputs no detection signal. That is, the CPU 54 of the vehicle control apparatus 52 receives a detection signal from the shift switch 69 to determine that the advance/reverse lever 31 is at the advance position [F] or the reverse position [R]. When receiving no detection signal, the CPU 54 determines that the advance/reverse lever 31 is at the neutral position [N].

An accelerator pedal position sensor 70 is provided at the accelerator pedal 32 to detect the depression amount of the accelerator pedal 32. The accelerator pedal position sensor 70 is connected to the engine control apparatus 53 and outputs a detection signal (pedal depression amount signal) corresponding to the depression amount. When depressed, the accelerator pedal 32 instructs acceleration of the forklift 10 (ON operation). When released, the accelerator pedal 32 does not instruct acceleration the forklift 10 (OFF operation).

An inching switch 71 is provided at the inching pedal 33 to detect the depression state of the inching pedal 33. The inching switch 71 is connected to the vehicle control apparatus 52 and outputs a detection signal (inching signal) that corresponds to the depression state. More specifically, when the clutch (the advancing clutch 42 or the reversing clutch 43) is engaged, the inching switch 71 outputs a detection signal. The clutch (the advancing clutch 42 or the reversing clutch 43) is either in an engaged state for transmitting power, a disengaged state for disconnecting power transmission, or a partially engaged state when being shifted between the engaged state and the disengaged state. Therefore, in this embodiment, the inching switch 71 is installed in such a manner as to output a detection signal when the clutch is in the engaged state. The inching switch 71 does not output detection signals when the clutch is in the disengaged state (disconnection state) and the partially engaged state. When depressed, the inching pedal 33 disengages the clutch (ON operation). When released, the inching pedal 33 is engages the clutch (OFF operation). When the operation of the inching pedal 33 is shifted form the ON operation to the OFF operation, the forklift 10 is shifted from a driving force disconnection state to a driving force connection state.

A brake switch 72 is provided at the brake pedal 34 to detect the depression state of the brake pedal 34. The brake switch 72 is connected to the Vehicle control apparatus 52 and outputs a detection signal (brake signal) that corresponds to the depression state. More specifically, the brake switch 72 outputs a detection signal when the brake pedal 34 is depressed. When the driver depresses solely the brake pedal 34, the brake switch 72 or when the driver depresses the brake pedal 34 together with the inching pedal 33, the brake switch 72 outputs a detection signal. When depressed, the brake pedal 34 causes the drum brakes 51 to apply braking force to the drive wheels 14 (ON operation). When released, the brake pedal 34 stops causing the drum brakes 51 to apply braking force to the drive wheels 14 (OFF operation).

In the forklift 10 of the present embodiment, when the engine 16 is started with the advance/reverse lever 31 at the neutral position [N], the advancing relay coil 60b and the reversing relay coil 61b are excited to open the advancing normally-closed contact 60a and the reversing normally-closed contact 61a. Thus, the advancing electromagnetic valve 44 and the reversing electromagnetic valve 45 are not energized. As a result, the advancing clutch 42 and the reversing clutch 43 are disengaged.

After the engine 16 is started, when the driver shifts the advance/reverse lever 31 from the neutral position [N] to the advance position [F], the vehicle control apparatus 52 receives a detection signal from the shift switch 69 (a signal indicating that the lever 31 has been shifted to the advance position [F]), and de-excites the advancing relay coil 60b, thereby energizing the advancing electromagnetic valve 44. As a result, the advancing clutch 42 is engaged. After the engine 16 is started, when the driver shifts the advance/reverse lever 31 from the neutral position [N] to the reverse position [R], the vehicle control apparatus 52 receives a detection signal from the shift switch 69 (a signal indicating that the lever 31 has been shifted to the reverse position [R]), and de-excites the reversing relay coil 61b, thereby energizing the reversing electromagnetic valve 45. As a result, the reversing clutch 43 is engaged. When the driver depresses the accelerator pedal 32, the engine control apparatus 53 receives a detection signal from the accelerator pedal position sensor 70 (a signal in accordance with the depression amount of the accelerator pedal 32) and controls the throttle actuator 35. The speed of the engine 16 is adjusted accordingly, and the forklift 10 travels in a direction that corresponds to the position of the advance/reverse lever 31 (advancing direction or reversing direction).

When the driver manipulates the lift lever 29, the vehicle control apparatus 52 receives a detection signal from the lift lever sensor 67 (a signal in accordance with the manipulation amount of the lift lever 29) and controls the fork lifting/lowering electromagnetic control valve 39. When the driver manipulates the tilt lever 30 during loading, the vehicle control apparatus 52 receives a detection signal from the tilt lever sensor 68 (a signal in accordance with the manipulation amount of the tilt lever 30) and controls the fork tilting electromagnetic control valve 38. Then, the driver depresses the inching pedal 33 during loading, thereby causing the clutches (the advancing clutch 42 and the reversing clutch 43) to be partially engaged or disengaged, and depresses the accelerator pedal 32. These manipulations (actions) causes rotation of the engine 16 to actuate the hydraulic pump 36. When the lift lever 29 is manipulated, hydraulic oil is supplied to the lift cylinders 25 by the fork lifting/lowering electromagnetic control valve 39. When the tilt lever 30 is manipulated, hydraulic oil is supplied to the tilt cylinders 24 by the fork tilting electromagnetic control valve 38. As a result, the lift cylinders 25 are extended or retracted in accordance with the manipulation direction of the lift lever 29, and the forks 22 are lifted or lowered, accordingly. Also, the tilt cylinders 24 are extended or retracted in accordance with the manipulation direction of the tilt lever 30, and the mast assembly 19 (the forks 22) are inclined forward or rearward, accordingly. During a loading operation of the forklift 10, the inching pedal 33 is depressed, the clutch (the advancing clutch 42 and the reversing clutch 43) is partially engaged or disengaged (disconnected). When the forklift 10 is driven after loading operation, the inching pedal 33 is released so that the clutch (advancing clutch 42 and the reversing clutch 43) is engaged. Then, the accelerator pedal 32 is depressed for instructing acceleration.

In the forklift 10 of the present embodiment as constructed above, the vehicle control apparatus 52 and the engine control apparatus 53 perform vehicle drive control and vehicle start control, thereby improving the driving stability of the forklift 10 during driving and starting. The vehicle drive control refers to control in which the maximum vehicle speed and acceleration/deceleration are limited during driving in accordance with the load state. The vehicle start control refers to control in which starting of the vehicle is limited in accordance with the load state and the engine speed. In the present embodiment, the vehicle start control prevents the vehicle from being suddenly started. The load states represents the state of a load on the forks 22. In this embodiment, the load state is determined based on the height, the weight, and the tilt angle. In the forklift 10, as the height of the forks 22 is increased, the weight of the load is increased, and the tilt angle is out of the rearward tilting range (for example, tilting forward), it is likely that the load state becomes harsher. That is, it is likely that the vehicle becomes unstable during driving and starting. Sudden start is caused when the driving force is connected when the engine 16 is revved up to a high engine speed. The harsher the load state, the more likely it becomes that the vehicle becomes unstable by a sudden start.

Hereafter, the vehicle drive control (control of the maximum vehicle speed and acceleration/deceleration) and the vehicle start control (control of sudden start) will be described. These controls are executed by the vehicle control apparatus 52 and the engine control apparatus 53 according to control programs.

Map data stored in the memory 55 of the vehicle control apparatus 52 will be described with reference FIG. 4 to FIG. 6.

Figure 4:
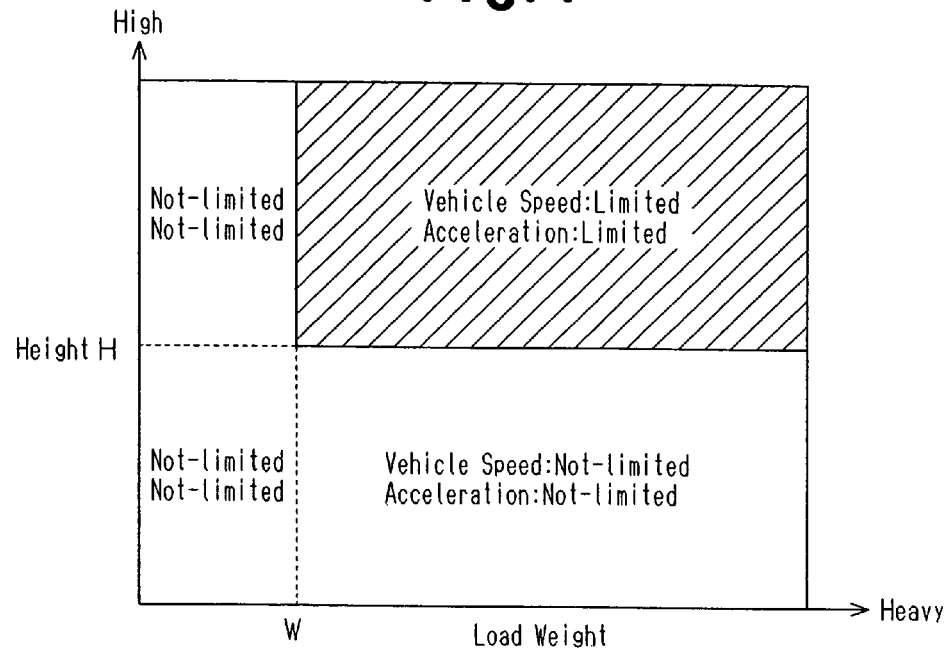
FIG. 4 is a relational diagram showing a limitation region and a no-limitation region of a vehicle, defined according to a load state.

The map data of FIG. 4 is referred to for determining whether the load state requires that the driving of the forklift 10 be limited (hereafter, referred to as necessity determining data). In this embodiment, the necessity determining data defines a limitation region, in which the maximum speed and acceleration/deceleration are limited based on two parameters, or the fork height and the load weight, and a non-limitation region, in which no limitation is imposed. Specifically, a region corresponding to fork heights equal to or more than a fork height H and load weights equal to or more than a load weight W is set as the limitation region, and a region corresponding to either fork heights less than the fork height H or load weights less than the load weight W is set as the non-limitation region. In the necessity determining data shown in FIG. 4, a region in which the fork height is high and the load weight is heavy, or a region in which the load state is harsh, is set as the limitation region. In FIG. 4, the limitation region is shown by a diagonally shaded area.

Figure 5:
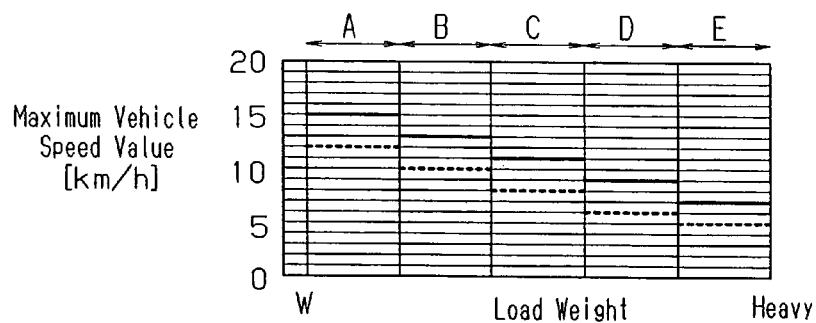
FIG. 5 is a relational diagram showing the relationship between the load state and a maximum vehicle speed value.

Map data of FIG. 5 is referred for computing a maximum vehicle speed value in the case where the maximum vehicle speed is limited, that is, when the load state is determined to be in the limitation region based on the necessity determining data of FIG. 4. The map data of FIG. 5 is hereafter referred to as vehicle speed computing data. In this embodiment, the vehicle speed computing data defines the maximum vehicle speed value [km/h] based on two parameters, or the load weight and the tilt angle. Specifically, the load region equal to or more than the load weight W is divided into several regions (in this embodiment, five regions A, B, C, D, E as shown in FIG. 5), and the maximum vehicle speed value is defined based on whether the tilt angle is in the rearward tilt range in each of the five regions. The case in which the tilt angle is in the rearward tilt range refers to a case in which the mast assembly 19 (the forks 22) is inclined rearward with respect to the vehicle body 11 (rearward inclined state). The case other than the rearward tilt range refers to a case where the mast assembly 19 is vertical (the forks 22 are horizontal) and a case where the mast assembly 19 is inclined forward with respect to the vehicle body 11 (forward inclined state).

According to the vehicle speed computing data of FIG. 5, the maximum vehicle speed value in the case where the tilt angle is in the rearward tilt range is shown by solid lines. The maximum vehicle speed value in the case where the tilt angle is out of the rearward tilt range is shown by broken lines. For example, in the region A, the maximum vehicle speed value in the case where the tilt angle is in the rearward tilting range is set to 15 (km/h), and the maximum vehicle speed value in the case where the tilt angle is out of the rearward tilting range is set to 12 (km/h). That is, when the tilt angle is out of the rearward tilt range, the center of gravity of the load is located in a front portion of the vehicle. On the other hand, when tilt angle is in the rearward tilt range, the center of gravity of the load is located in a rear portion of the vehicle. Therefore, when the tilt angle is but of the rearward tilt range, the load state is harsher than the case where the tilt angle is in the rearward tilt range. Thus, even if the weight of the load is the same, the maximum vehicle speed value varies in accordance with the tilt angle. When the tilt angle is out of the rearward tilt range, the maximum vehicle speed is set lower than the case where the tilt angle is in the rearward tilt range.

Figure 6:
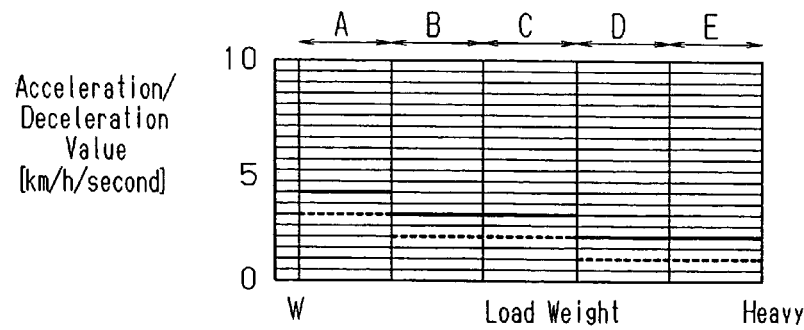
FIG. 6 is a relational diagram showing the relationship between the load state and an acceleration/deceleration value.

Map data of FIG. 6 is referred for computing an acceleration/deceleration value in the case where the acceleration/deceleration is limited, that is, when the load state is determined to be in the limitation region based on the necessity determining data of FIG. 4. The map data of FIG. 5 is hereafter referred to as acceleration/deceleration computing data. In this embodiment, the acceleration/deceleration computing data defines the acceleration/deceleration value [km/h/second] based on two parameters, or the load weight and the tilt angle. Specifically, the load region equal to or more than the load weight W is divided into several regions (in this embodiment, five regions A, B, C, D, E as shown in FIG. 5), and the acceleration/deceleration value is defined based on whether the tilt angle is in the rearward tilt range in each of the five regions. [km/h/second] is a value obtained by converting the acceleration/deceleration value per second into the acceleration/deceleration value per hour. In the acceleration/deceleration data of FIG. 6, the load region equal to or more than the weight W is divided at the same values of the weight as the vehicle speed computation data of FIG. 5.

According to the acceleration/deceleration computing data of FIG. 6, the acceleration/deceleration value in the case where the tilt angle is in the rearward tilt range is shown by solid lines. The acceleration/deceleration value in the case where the tilt angle is out of the rearward tilt range is shown by broken lines. For example, in region A, the acceleration/deceleration value in the case where the tilt angle is in the rearward tilting range is set to 4 km/h/second, and the acceleration/deceleration value in the case where the tilt angle is out of the rearward tilting range is set to 3 km/h/second. That is, even if the weight of the load is the same, the acceleration/deceleration value varies in accordance with the tilt angle. When the tilt angle is out of the rearward tilt range, the acceleration/deceleration value is set lower than the case where the tilt angle is in the rearward tilt range. Hereinafter, in the acceleration/deceleration data shown in FIG. 6, acceleration/deceleration values of 1 km/h/second, 2 km/h/second, 3 km/h/second, and 4 km/h/second are referred to, when necessary, as acceleration/deceleration level 1, acceleration/deceleration level 2, acceleration/deceleration level 3, and acceleration/deceleration level 4.

The contents of the control executed by the CPU 54 of the vehicle control apparatus 52 will now be described with reference to FIGS. 7 to 9.

Figure 7:
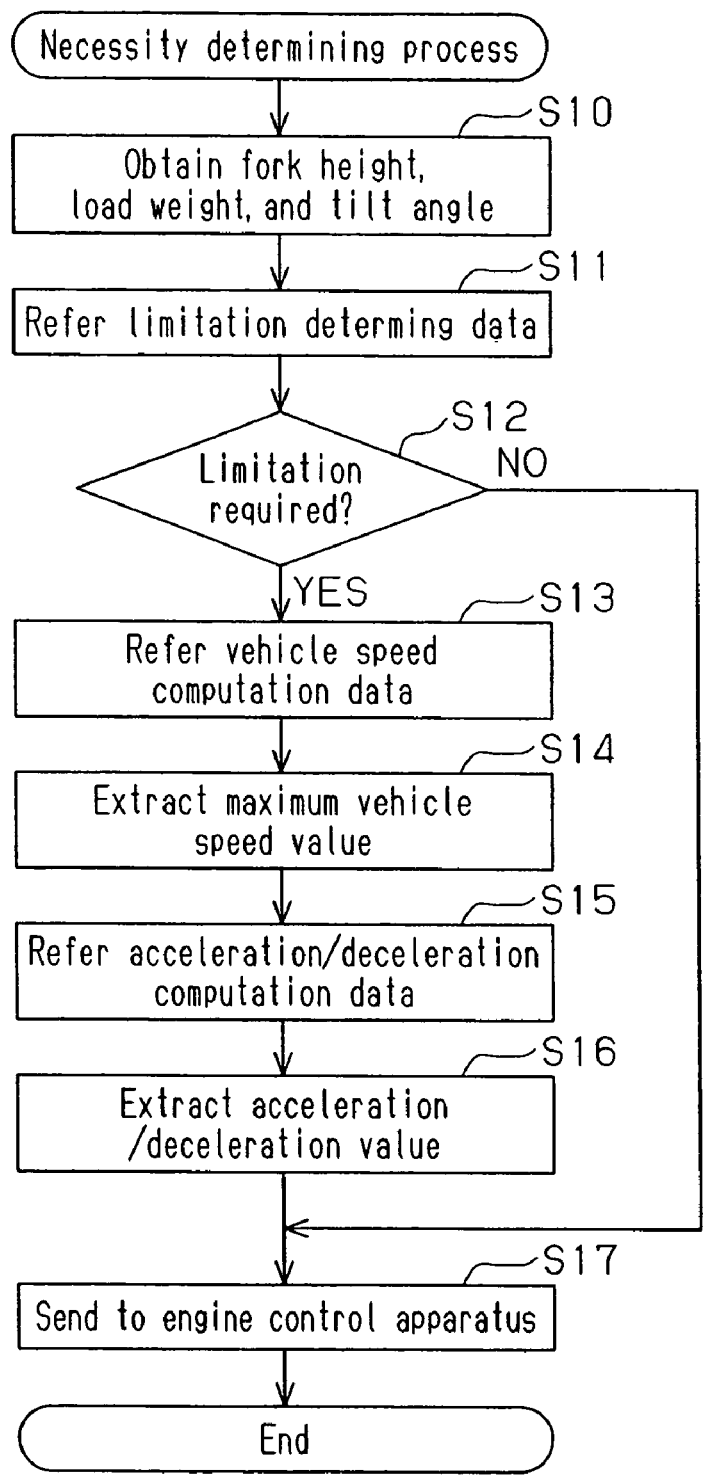
FIG. 7 is a flowchart showing a limitation determining process.

FIG. 7 shows a limitation determining process for limiting the maximum vehicle speed and the acceleration/deceleration. FIG. 8 shows a start control process for controlling the start of the forklift 10. FIG. 9 is an engine rev down process for reducing the engine speed. The engine rev down process is executed during the start control process. To rev down the engine 16 means to reduce the speed of the engine 16. In this embodiment, the CPU 54, which executes the limitation determining process shown in FIG. 7 and the start control process shown in FIG. 8, functions as a connection determining section, a load state determining section, an engine speed determining section, and a disconnection control section. In the present embodiment, the CPU 54, which executes the engine rev down process shown in FIG. 9, and the CPU 57 of the engine control apparatus 53, which controls the engine 16 with instructions of the CPU 54 executing the engine rev down process function as an engine speed control section.

First, the limitation determining process of FIG. 7 will be described. The CPU 54 executes the limitation determining process a predetermined control cycle.

In the limitation determining process, the CPU 54 obtains information related to the fork height, the load weight, and the tilt angle for determining the load state (step S10). At step S10, the CPU 54 obtains the fork height, the tilt angle, and the load weight from detection signals from the height sensor 64, the tilt angle sensor 65, and the load weight sensor 66. Subsequently, the CPU 54 refers to the necessity determining data shown in FIG. 4 (step S11), and determines whether the load state requires limitation on the vehicle speed (the maximum vehicle speed and the acceleration/deceleration) based on the information regarding the fork height and the load weight obtained at step S10 and the data of FIG. 4 (step S12). At step S12, the CPU 54 determines whether the load state is in the limitation region, which corresponds to high fork heights and heavy load weights.

If the decision outcome of step S12 is positive (limitation required), the CPU 54 refers to the vehicle speed computation data shown in FIG. 5 (step S13), and extracts the maximum vehicle speed value based on the referred data and the information related to the weight load and the tile angle obtained at step S10 (step S14). At step S14, if, for example, the load weight is in the region B, the CPU 54 extracts 13 km/h as the maximum vehicle speed value in the case where the tilt angle is in the rearward tilt range, and extracts 10 km/h in the case where the tilt angle is out of the rearward tilt range. After extracting the maximum vehicle speed value at step S14, the CPU 54 stores the extracted maximum vehicle speed value in the memory 55.

Subsequently, the CPU 54 refers to the acceleration/deceleration data shown in FIG. 5 (step S15), and extracts the acceleration/deceleration value based on the referred data and the information related to the weight load and the tile angle obtained at step S10 (step S16). At step S16, if, for example, the load weight is in the region B, the CPU 54 extracts 3 km/h/second as the acceleration/deceleration value in the case where the tilt angle is in the rearward tilt range, and extracts 2 km/h/second in the case where the tilt angle is out of the rearward tilt range. After extracting the acceleration/deceleration value at step S16, the CPU 54 stores the extracted acceleration/deceleration value in the memory 55.

Subsequently, the CPU 54 sends a limitation signal to the engine control apparatus to instruct the maximum vehicle speed value extracted at step S14 and the acceleration/deceleration value extracted at step S16. Thereafter, the CPU 54 ends the limitation determining process. If the decision outcome of step S12 is negative (limitation not required), the CPU 54 proceeds to step S17, and sends a limitation signal to the engine control apparatus to instruct not to limit the maximum vehicle speed and the acceleration/deceleration. If the decision outcome of step S12 is negative, the CPU 54 stores in the memory 55 the fact that the maximum vehicle speed and the acceleration/deceleration will not be limited. Thereafter, the CPU 54 ends the limitation determining process. When the decision outcome at step S12 is negative, the load state is in the non-limitation region (low fork height or light load weight).

The start control process shown in FIG. 8 and the engine rev down process shown in FIG. 9, which is executed as a subroutine of the start control process will now be described. The CPU 54 executes the limitation determining process a predetermined control cycle.

In the start control process, the CPU 54 determines whether the driving force has been connected (step S20). That is, the CPU 54 determines whether the driving force disconnection state has been switched to the driving force connection state at step S20. In the present embodiment, the CPU 54 monitors input of a detection signal of the inching switch 71 at step S20, and performs the determination based on whether the detection signal has been inputted. When receiving a detection signal from the inching switch 71 after a period of receiving no detection signal from the inching switch 71, the CPU 54 detects that the driving force disconnection state has been switched to the driving force connection state at step S20. In this case, the decision outcome of step S20 is positive. When receiving no detection signal, the decision outcome of step S20 is negative.

If the decision outcome of step S20 is positive, the CPU 54 determines whether the maximum vehicle speed and the acceleration/deceleration need to be limited (step S21). The CPU 54 performs the determination of step S21 based on the decision outcome at step S21 of the limitation determining process. When the memory 55 retains the maximum vehicle speed value and the acceleration/deceleration value, the CPU 54 determines that the decision outcome of step S21 is positive. If the memory 55 does not retain the maximum vehicle speed value and the acceleration/deceleration value, the CPU 54 determines that the decision outcome of step S21 is negative.

If the decision outcome at step S21 is positive, the CPU 54 obtains information related to the engine speed for determining the engine speed (the rev up state of the engine 16) at the time when the driving force disconnection state is switched to the driving force connection state (step S22). At step S22, the CPU 54 obtains the engine speed from a detection signal of the engine speed sensor 62. The CPU 54 receives and obtains the engine speed obtained by the CPU 57 of the engine control apparatus 53 via the engine control apparatus 53. Then, the CPU 54 compares the engine speed obtained at step S22 (represented by M in FIG. 8) with a predetermined limitation engine speed (represented by Ma in FIG. 8), and determines whether the engine speed M is greater than or equal to the limitation engine speed Ma (step S23). The limitation engine speed Ma is set greater than the idle speed (the engine speed during idling). In this embodiment, the limitation engine speed Ma is set to 1700 rpm. At step S23, the CPU 54 determines whether the driving force disconnection state has been switched to the driving force connection state at a high engine speed, that is, when the engine 16 has been revved up. The limitation engine speed Ma is a value obtained by taking into consideration the load state (the contents of the limitation during driving) through experiments (simulations) to find out what engine speed reduces the stability at the start. Therefore, the limitation engine speed Ma varies depending on the type of the forklift 10.

When the decision outcome at step S23 is positive (Ma≦M), the CPU 54 determines whether the acceleration/deceleration value determined at step S16 of the limitation determining process is 1 km/h/second or 2 km/h/second, that is, whether the acceleration/deceleration level is [1] or [2] (step S24). Of four acceleration/deceleration levels [1] to [4] in this embodiment, the acceleration/deceleration levels [1] and [2] are levels that correspond to cases in which the load state is harsh.

If the decision outcome of step S24 is positive, the CPU 54 forcibly disconnects the driving force (step S25). At step S25, the CPU 54 controls the advancing electromagnetic valve 44 or the reversing electromagnetic valve 45, thereby forcibly disconnecting the driving force. Specifically, the CPU 54 excites the advancing relay coil 60*b* and the reversing relay coil 61*b* when the detection signal of the shift switch 69 for detecting the position of the advance/reverse lever 31 indicates the advance position [F] or the reverse position [R]. That is, the advancing normally-closed contact 60*a* and the reversing normally-closed contact 61*a* are opened when the advancing relay coil 60*b* and the reversing relay coil 61*b* are excited. Therefore, the advancing electromagnetic valve 44 and the reversing electromagnetic valve 45 are not energized and the opening degrees are maximized. Therefore, the advancing clutch 42 and the reversing clutch 43 are supplied with hydraulic oil by the action of the hydraulic pump 46, and are thus disengaged. This disconnects the driving force. At step S25, the CPU 54 executes disconnection control for forcibly disconnecting the driving force.

Figure 9:
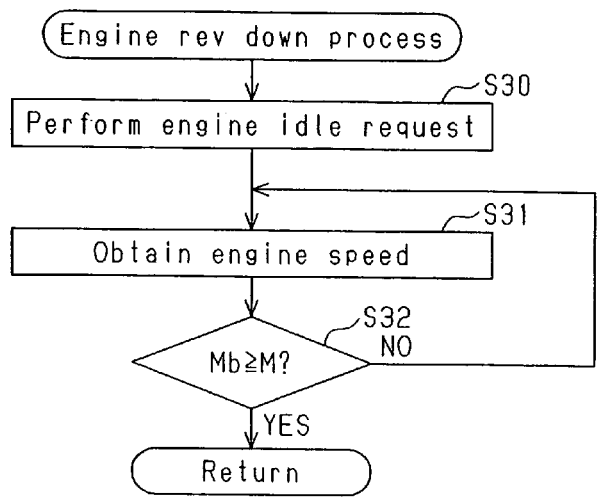
FIG. 9 is a flowchart showing an engine rev down process, which is executed as a subroutine of the start limiting process shown in FIG. 8.

After step S25, the CPU 54 executes the engine rev down process shown in FIG. 9 (step S26). The engine rev down process is a process for reducing the engine speed to a speed equal to or less than a predetermined engine speed (in this embodiment, 1000 rpm). After the engine rev down process, the CPU 54 proceeds to step S27 of the start control process. At step S27, the CPU 54 cancels the state of disconnection of the driving force, thereby reconnecting the driving force. At step S27, the CPU 54 controls the advancing electromagnetic valve 44 or the reversing electromagnetic valve 45, thereby reconnecting the driving force. Specifically, when the detection signal of the shift switch 69 for detecting the position of the advance/reverse lever 31 indicates the advance position [F] or the reverse position [R], the CPU 54 de-excites the corresponding one of the advancing relay coil 60*b* and the reversing relay coil 61*b*. That is, the advancing normally-closed contact 60*a* and the reversing normally-closed contact 61*a* are closed when the advancing relay coil 60*b* and the reversing relay coil 61*b* are de-excited. Therefore, the advancing electromagnetic valve 44 and the reversing electromagnetic valve 45 are energized and fully closed. Therefore, the advancing clutch 42 and the reversing clutch 43 are not supplied with hydraulic oil by the action of the hydraulic pump 46, and are thus engaged. This connects the driving force. Accordingly, the driving force (the power of the engine 16) is transmitted to the drive wheels 14 via the transmission 18, so that the forklift 10 is in a drivable state. In this embodiment, the engine rev down process is executed in the start control process, so that the vehicle control apparatus 52 automatically cancels the state of disconnection of the driving force.

After step S27, the CPU 54 ends the start control process. When the decision outcome of step S24 is negative, the acceleration/deceleration level is [3] or [4]. In this case, the CPU 54 executes the engine rev down process at step S28. The engine rev down process at step S28 is the same as the engine rev down process executed at step S26 (FIG. 9). After the rev down process of step S28, the CPU 54 ends the start control process. Also, when the decision outcomes of steps S20, S21 are negative, the CPU 54 ends the start control process. When the decision outcome of step S20 is negative, the clutch is disengaged or the vehicle is traveling. Also, then the decision outcome is negative at step S21, the load state is not limiting the driving of the vehicle.

In this embodiment, even if the maximum vehicle speed and the acceleration/deceleration are limited at step S24 of the start control process, such a state is further divided according to the acceleration/deceleration level, and the contents of limitation on the start are differentiated between a state of harsh limitation contents are a state of relaxed limitation contents (that is, according to the degree of influence on the stability at the start). That is, even if the engine rev down process shown in FIG. 9 is executed, the speed of the engine 16 is not instantly reduced to a speed equal to or less than the predetermined engine speed, but takes some time to be reduced. Therefore, in a harsh load state (high fork height or heavy load weight), in which the acceleration/deceleration level is determined to [1] or [2], control for reducing the engine speed does not reduce the engine speed to a sufficient level, and as a result, the starting of the vehicle becomes unstable. Therefore, according to this embodiment, in a harsh load state as described above, the driving force is forcibly disconnected in addition to reduction of the engine speed, so that the driving (starting) of the vehicle is temporarily suspended until the engine 16 is revved down (the driving (starting) of the vehicle is restricted). When the engine speed has dropped to the predetermined speed, the driving force is connected, so that the vehicle is drivable. On the other hand, in a load state where the acceleration/deceleration level is determined to be [3] or [4], that is, in a load state where stable driving is possible by simply reducing the engine speed without disconnecting the driving force, only the engine speed is controlled.

The engine rev down process shown in FIG. 9 will now be described.

In the engine rev down process, the CPU 54 outputs a request signal to the CPU 57 of the engine control apparatus 53, which request signal is for performing engine idle request (request for reducing the speed of the engine 16) at step S30. When receiving the request signal, the CPU 57 controls the throttle actuator 35, thereby adjusting the speed of the engine 16. Regardless of the detection result of the accelerator pedal position sensor 70 (the depression amount of the accelerator pedal 32), the CPU 57 controls the engine 16 to reduce the engine speed.

After step S30, the CPU 54 obtains information related to the engine speed (step S31). At step S31, the CPU 54 obtains the engine speed in the same manner as step S22 of the start control process shown in FIG. 8. Then, the CPU 54 compares the engine speed obtained at step S31 (represented by M in FIG. 9) with a predetermined limitation canceling engine speed (represented by Mb in FIG. 9), and determines whether the engine speed M is less than or equal to the limitation canceling engine speed Mb (step S32). The limitation canceling engine speed Mb is set lower than the limitation engine speed Ma. In this embodiment, the limitation canceling engine speed Mb is set to 1000 rpm. The limitation canceling engine speed Mb is a value obtained by taking into consideration the load state (the contents of limitation during driving) through experiments (simulations) to find out the degree of reduction of engine speed that maintains the stability of the vehicle at the start. Therefore, the limitation canceling engine speed Mb varies depending on the type of the forklift 10. If the decision outcome at step S32 is negative (Mb<M), the CPU 54 proceeds to step S31 and repeats the process from step S31. On the other hand, when the decision outcome of step S32 is positive (Mb≧M), the CPU 54 ends the engine rev down process and returns to the start control process.

Next, the contents of control by the engine control apparatus 53 (particularly, the contents of control of the maximum vehicle speed and the acceleration/deceleration) will be described with reference to FIG. 10.

Figure 10:
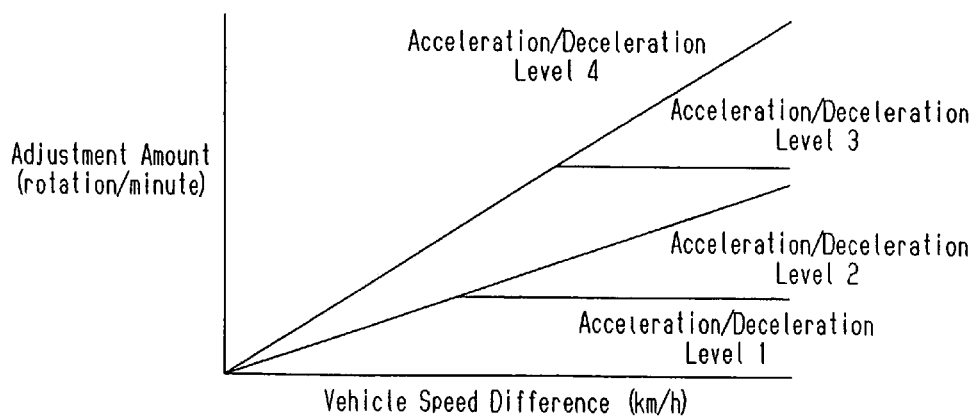
FIG. 10 is a relational diagram showing the relationship among an adjustment amount of the engine speed, a vehicle speed difference, and an acceleration/deceleration level.

FIG. 10 shows map data for computing the amount of adjustment of the engine speed (hereafter, referred to as engine speed adjustment data), which is stored in the memory 58 of the engine control apparatus 53. Based on the maximum vehicle speed value and the acceleration/deceleration value extracted at steps S14, S16 of the limitation determining process shown in FIG. 7, the CPU 57 of the engine control apparatus 53 computes the adjustment amount of the engine speed from the engine speed adjustment data, and controls the engine speed. When the driving of the vehicle is limited, the CPU 57 controls the engine 16 such that the vehicle speed is equal to or less than the maximum vehicle speed value regardless of the detection result of the accelerator pedal position sensor 70 (the depression amount of the accelerator pedal 32). That is, when the maximum vehicle speed and the acceleration/deceleration are limited, the forklift 10 is not driven at a vehicle speed that surpasses the maximum vehicle speed value even if the driver fully depresses the accelerator pedal 32. Also, the degree of acceleration and the degree of deceleration differ in accordance with the acceleration/deceleration level.

The engine speed adjustment data of the present embodiment is a graph representing the relationship between the difference between the maximum vehicle speed value and the actual vehicle speed (hereafter, referred to as vehicle speed difference) and the adjustment amount of the engine speed. The relationship is determined according to the four acceleration/deceleration levels [1] to [4]. The vehicle speed difference is a difference between the maximum vehicle speed value extracted at step S14 of the limitation determining process and the vehicle speed detected by the vehicle speed sensor 63. In the engine speed adjustment data, the relationship between the vehicle speed difference and the engine speed is defined such that the adjustment amount of the engine speed increases as the vehicle speed difference increases. The relationship between the vehicle speed difference and the adjustment amount of the engine speed is defined such that, as the acceleration/deceleration level approaches [1] (as the load state becomes harsher), the adjustment amount of the engine speed is reduced in relation to the vehicle speed difference. That is, since as the acceleration/deceleration level approaches the level [1], the adjustment amount of the engine speed decreases, the forklift 10 is gradually accelerated and gradually decelerated.

When limiting the maximum vehicle speed and the acceleration/deceleration, the CPU 57 of the engine control apparatus 53 adjusts the speed of the engine 16 in the following manner.

The CPU 57 obtains the current vehicle speed from a detection signal of the vehicle speed sensor 63 at every predetermined control cycle, and subtracts the obtained vehicle speed from the maximum vehicle speed value, thereby computing the vehicle speed difference. Subsequently, the CPU 57 obtains the acceleration/deceleration value (the value of the acceleration/deceleration level) stored in the memory 58. Based on the vehicle speed difference and the acceleration/deceleration level, the CPU 57 computes the adjustment amount of the engine speed from the engine speed adjustment data shown in FIG. 10. After computing the adjustment amount of the engine speed, the CPU 57 controls the throttle actuator 35 based on the adjustment amount, thereby adjusting the throttle opening degree. The speed of the engine 16 is adjusted, accordingly. That is, the CPU 57 performs feedback control such that the actual vehicle speed does not exceed the maximum vehicle speed value.

The present embodiment has the following advantages.

(1) When the driving force disconnection state is switched to the driving force connection state by an operation of the driver (in this embodiment, an operation of the inching pedal 33), the transmission of the driving force to the drive wheels 14 is forcibly disconnected if the load state requires limitation on the vehicle and the engine speed M is equal to or more than the limitation engine speed Ma. Since the driving force disconnection state is switched to the driving force connection state, the forklift 10 is in a drivable state, that is, a starting state. If acceleration is instructed in the driving force disconnection state (when the accelerator pedal 32 is operated), the engine 16 of the forklift 10 is revved up, and the engine speed M is increased. Therefore, in a state where the load state requires that the vehicle driving be limited (for example, a high fork height or a heavy load weight) and the engine 16 has been revved up, the start of the forklift 10 is likely to cause the driving to be unstable. That is, the forklift 10 is likely to be suddenly started in a state where the load state is likely to cause the driving of the vehicle to be unstable. Therefore, in the driving force connection state, by forcibly disconnecting the driving force in accordance with the load state and the engine speed, the start of the forklift 10 under a state that is likely to cause the driving of the vehicle to be unstable is avoided. That is, the stability of the forklift 10 at the start is ensured, which would not be achieved by controlling the maximum vehicle speed and the acceleration/deceleration during the driving of the forklift 10.

(2) Particularly, in the case of the forklift 10 of this embodiment, the same driving source (the engine 16) is used for driving and loading. In this case, the driving force is disconnected by depressing the inching pedal 33. In this state, the accelerator pedal 32 is depressed to actuate the loading device 12. Thus, when the loading device 12 is being actuated, depression of the accelerator pedal 32 revs up the engine 16, and the engine speed is increased. Under such working environment, when, for example, the driver releases the inching pedal 33, the driving force disconnection state is switched to the driving force connection state. This is likely to cause the forklift 10 to suddenly start. That is, the forklift 10 starts under a condition that is likely to cause the driving of the vehicle to be unstable. Therefore, under the working environment, the stability of the driving of the forklift 10 is ensured.

(3) When the driving force is forcibly disconnected, a control is executed for reducing the engine speed M to a value equal to or less than the limitation canceling engine speed Mb. Since the engine speed M is reduced to a value equal to or less than the limitation canceling engine speed Mb, the driving force disconnection state is canceled. When the driving force disconnection state is cancelled, transmission of the driving force to the drive wheel 14 is resumed, so that the forklift 10 is drivable. Therefore, since the forklift 10 is started with the reduced engine speed M, the forklift 10 is started in a stable manner. That is, the forklift 10 is prevented from being suddenly started, and the stability at the start is ensured.

(4) Whether the state has been switched to the driving force connection state is determined based on the operation state of the inching pedal 33. Based on the decision outcome, whether the driving force should be disconnected is determined (step S23 of the start control process shown in FIG. 8). When the driver drives the forklift 10 to travel (engage the clutch) or causes the forklift 10 not to travel (disengage the clutch), the inching pedal 33 is used for expressing the intention of the driver. Therefore, by performing the aforementioned determination when the inching pedal 33 is operated, the cause of forcible disconnection of the driving force during driving is notified to the driver.

(5) The content of the control at the start is changed according to the load state. Specifically, when the acceleration/deceleration level is [1] or [2], the control for disconnecting the driving force and reducing the engine speed is executed. When the acceleration/deceleration level is [3] or [4], the control for reducing the engine speed is executed. Therefore, in a state that cannot be dealt with only by controlling the engine speed (the engine 16), the driving force is disconnected, so that a sudden start is reliably avoided. On the other hand, in a state that can be dealt with only by controlling the engine speed (the engine 16), a sudden start is reliably avoided by controlling the engine speed without disconnecting the driving force. That is, when the driving force is disconnected, the advancing electromagnetic valve 44 and the reversing electromagnetic valve 45 are controlled to reliably disconnect the driving force without complicating the structure of the forklift 10. A vehicle such as the forklift 10 is repeatedly started and stopped. Therefore, when executing control for starting, the number of activations of the relay circuits (the advancing relay circuit 60 and the reversing relay circuit 61) for actuating the electromagnetic valves 44, 45 is likely to be increased. Therefore, since the driving force is selectively disconnected and connected according to the load state, the start control can be performed without excessively increasing the number of activations of the relay circuits.

A second embodiment of the present invention will now be described with reference to FIG. 11. In the following embodiments, explanations of the same components of the already described embodiment will be omitted or simplified.

In this embodiment, when the driving force is forcibly disconnected, the disconnection state is cancelled by operation of the driver. Specifically, performing the ON operation of the accelerator pedal 32 after performing the OFF operation of the accelerator pedal 32 is set as a cancellation condition to cancel the disconnection state. FIG. 11 shows a start control process executed by the CPU 54 of the vehicle control apparatus 52 in this embodiment.

The start control process of this embodiment will be described with reference to FIG. 11. In FIG. 11, the same reference numerals are given to those steps that are the same as the corresponding steps in the start control process (FIG. 8) of the first embodiment. In the following, the redundant explanations for the same processes will be omitted or simplified, and different processes will mainly be described.

Figure 11:
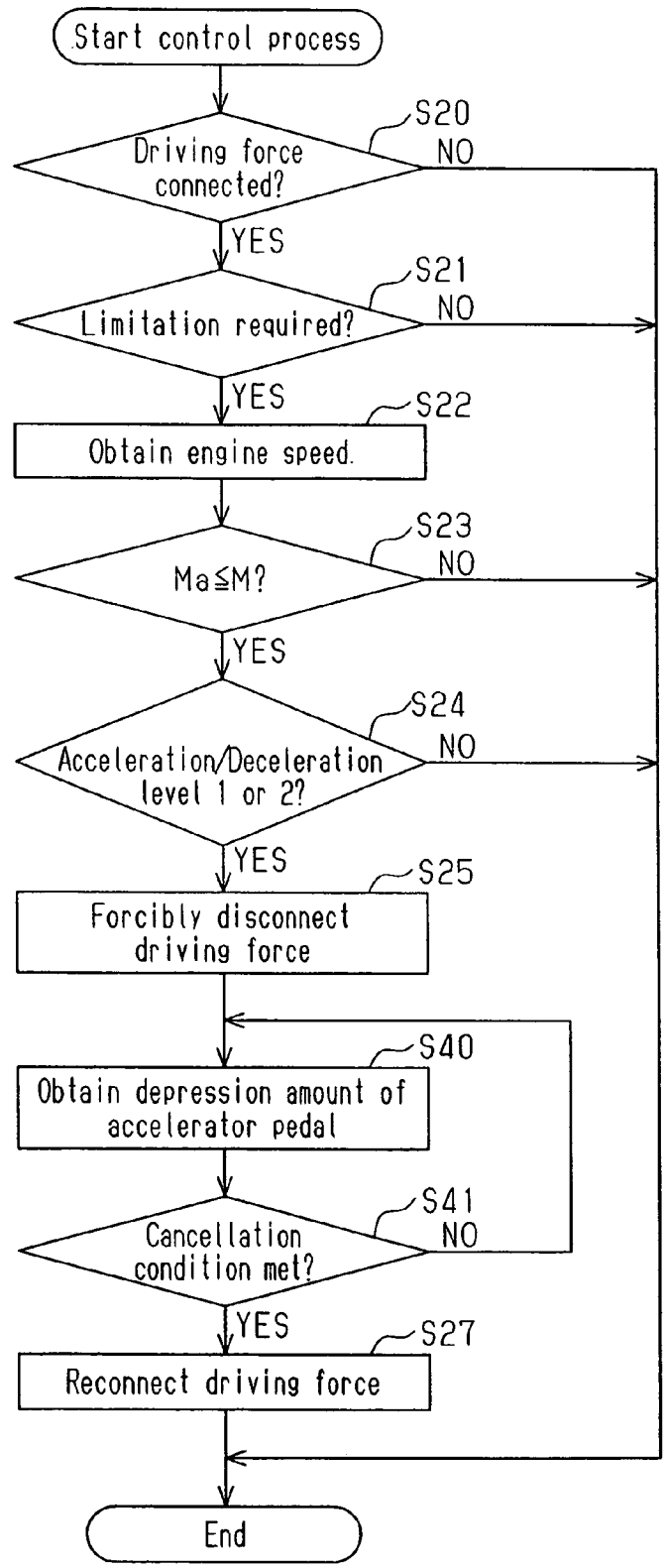
FIG. 11 is a flowchart showing a start limiting process according to a second embodiment.

In the start control process shown in FIG. 11, when the decision outcome of step S23 is positive, the CPU 54 of the vehicle control apparatus 52 determines whether the acceleration/deceleration level is [1] or [2] at step S24. If the decision outcome at step S24 is positive, the CPU 54 forcibly disconnects the driving force at step S25. At step S25, the CPU 54 controls the advancing electromagnetic valve 44 and the reversing electromagnetic valve 45 as in the first embodiment, thereby disconnecting the driving force. After disconnecting the driving force at step S25, the CPU 54 determines whether the above described cancellation condition is met at steps S40 and S41.

First, at step S40, the CPU 54 receives a detection signal from the accelerator pedal position sensor 70 provided at the accelerator pedal 32, and obtains the depression amount of the accelerator pedal 32 (accelerator pedal position). When the detection signal of the accelerator pedal position sensor 70 indicates zero, the CPU 54 detects that the accelerator pedal 32 is not depressed (OFF operation). When the detection signal of the accelerator pedal position sensor 70 indicates a value greater zero, the accelerator pedal position sensor 70 detects that the accelerator pedal 32 is being depressed (ON operation). Based on the information obtained at step S40, the CPU 54 determines at step S41 whether the cancellation condition is met, that is, whether the ON operation of the accelerator pedal 32 is performed after the OFF operation.

If the decision outcome at step S41 is positive, the CPU 54 controls at step S27 the advancing electromagnetic valve 44 and the reversing electromagnetic valve 45 as in the first embodiment, thereby canceling the driving force disconnection state. Accordingly, the driving force (the power of the engine 16) is transmitted to the drive wheels 14 via the transmission 18, so that the vehicle is in a drivable state. On the other hand, if the decision outcome at step S41 is negative, the CPU 54 returns to step S40 and repeats the process of steps S40, S41. That is, the CPU 54 maintains the driving force disconnection state until the canceling condition is met.

Therefore, in addition to the advantages (1), (2), and (4) of the first embodiment, the second embodiment provides the following advantages.

(6) When the driving force is forcibly disconnected, the driving force disconnection state is canceled if the driver performs the ON operation of the accelerator pedal 32 after the OFF operation. When the driver performs the ON operation of the accelerator pedal 32, the engine speed M of the forklift 10 is increased to reach or surpass the limitation engine speed Ma. The engine speed M is reduced when the driver performs the OFF operation of the accelerator pedal 32. By having the driver to perform the series of operations, time for reducing the engine speed M is ensured, so that the forklift 10 is allowed to be driven with the engine speed M reduced. That is, the forklift 10 is prevented from being suddenly started, and the stability at the start is ensured.

A third embodiment of the present invention will now be described with reference to FIGS. 12 and 13. This embodiment may be applied to both of the first and second embodiments.

Figure 8:
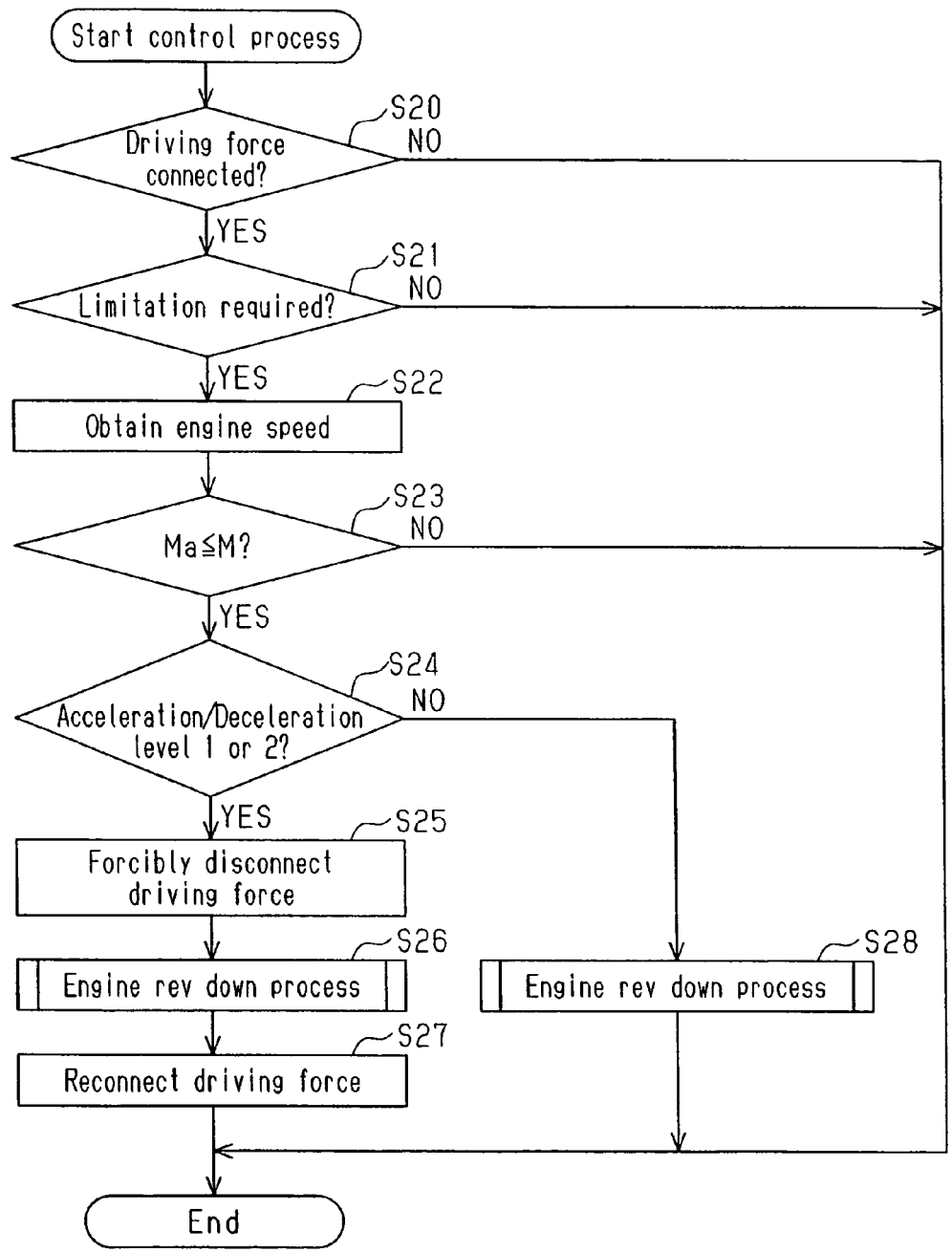
FIG. 8 is a flowchart showing a start limiting process according to a first embodiment.

In this embodiment, at step S20 of the start control process shown in FIG. 8, the determination of whether the driving force disconnection state has been switched to the driving force connection state is performed by detecting the clutch pressure of the pressure receiving chambers 42*a*, 43*a* of the advancing clutch 42 and the reversing clutch 43.

The structure of the forklift 10 of this embodiment will now be described with reference to FIG. 12. FIG. 12 mainly shows differences from the forklift 10 described in the first embodiment (shown in FIG. 3). The components (structure) that are not shown in FIG. 12 are the same as those of the forklift 10 shown in FIG. 3.

Figure 12:
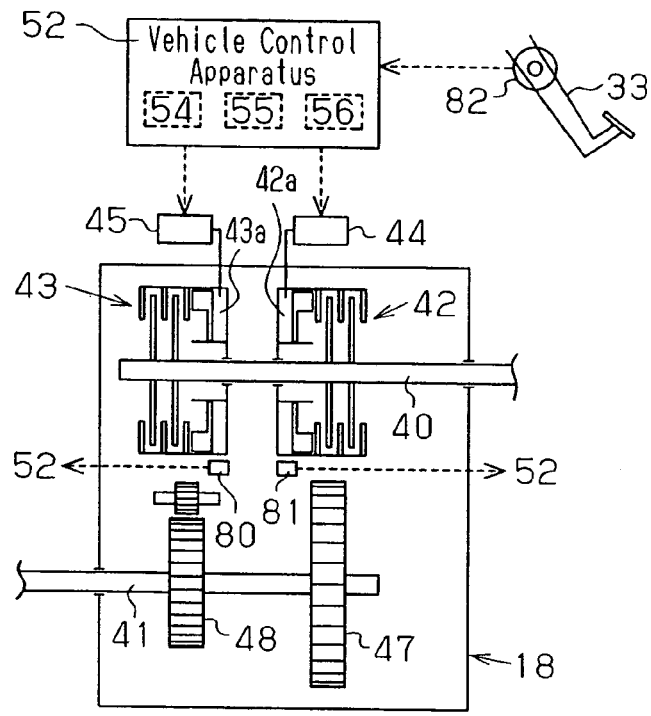
FIG. 12 is a diagrammatic view illustrating the structure of a forklift according to a third embodiment.

As shown in FIG. 12, clutch pressure sensors 80, 81 are provided at the advancing clutch 42 and the reversing clutch 43 to detect the clutch pressure (hydraulic pressure) of the pressure receiving chambers 42*a*, 43*a*. The clutch pressure sensors 80, 81 are connected to the vehicle control apparatus 52 and detect the hydraulic pressures in the pressure receiving chambers 42*a*, 43*a*. The clutch pressure sensors 80, 81 output detection signals (clutch pressure signals) that correspond to the hydraulic pressures. The clutch pressure sensors 80, 81 are formed, for example, by pressure sensors. An inching pedal position sensor 82 is provided at the inching pedal 33 of this embodiment to detect the depression amount (pedal stroke) of the inching pedal 33. The inching pedal position sensor 82 is connected to the vehicle control apparatus 52 and outputs a detection signal (pedal depression amount signal) corresponding to the depression amount. The way in which the inching pedal 33 is operated is the same as that of the first embodiment. That is, when depressed, the inching pedal 33 is operated to disengage the clutch. When released, the inching pedal 33 is operated to engage the clutch.

Figure 13:
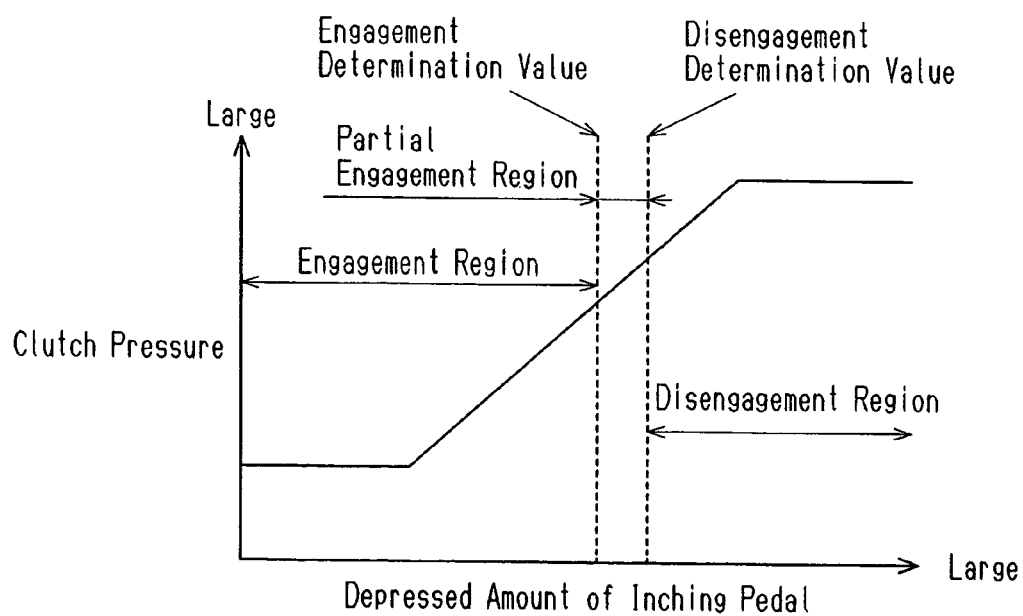
FIG. 13 is a relational diagram showing the relationship between a clutch pressure and the depression amount of an inching pedal.

The memory 55 of the vehicle control apparatus 52 stores map data (hereafter, referred to as connection determining data) shown in FIG. 13. The connection determining data is a graph representing the relationship between the depression amount of the inching pedal 33 and the clutch pressure. When the clutch pressure in the pressure receiving chambers 42*a*, 43*a* of the advancing clutch 42 and the reversing clutch 43 of this embodiment is lowered, the engaging force increased so that the clutch is engaged. When the clutch pressure is increased, the engaging force is reduced, and the clutch is disengaged. That is, when the depression amount of the inching pedal 33 is small, the clutch is engaged and the clutch pressure is reduced. When the depression amount of the inching pedal 33 is great, the clutch is disengaged, and clutch pressure is increased. The connection determining data includes two determination values, or an engagement determination value and a disengagement determination value for determining whether the clutch is engaged or disengaged. A hysteresis exists between these two values. That is, the connection determining data has three regions, which are an engagement region, a partial engagement region, and a disengagement region, which are divided by the engagement determination value and the disengagement determination value. The partial engagement region is included in the engagement region when the ON operation of the inching pedal 33 is performed (the depression amount being increased), and is included in the disengagement region when the OFF operation of the inching pedal 33 is performed (the depression amount being decreased).

Hereafter, the process executed by the CPU 54 at step S20 of the start control process shown in FIG. 8 will be described.

At step S20 of the start control process shown in FIG. 8, the CPU 54 receives detection signals from the clutch pressure sensors 80, 81, and obtains the clutch pressures of the pressure receiving chambers 42*a*, 43*a*. Subsequently, based on the obtained clutch pressure and the information of the depression amount of the inching pedal 33, the CPU 54 determines whether the clutch is engaged or disengaged by referring to the connection determining data. In this embodiment, the CPU 54 receives a detection signal of the inching pedal position sensor 82 at every predetermined control cycle. The CPU 54 compares the detection result (the depression amount of the inching pedal 33) obtained in the current control cycle with the detection result obtained in the previous control cycle, and determines whether the OFF operation of the ON operation of the inching pedal 33 is performed based on the comparison result. When determining that the clutch is engaged based on the clutch pressure and the operation state of the inching pedal 33, the CPU 54 determines that the outcome of step S20 is positive. When determining that the clutch is disengaged, the CPU 54 ends the start control process. That is, when the ON operation of the inching pedal 33 is being performed, the CPU 54 determines that the clutch is disengaged if the clutch pressure is equal to or less than the disengagement determination value. When the OFF operation of the inching pedal 33 is being performed, the CPU 54 determines that the clutch is engaged if the clutch pressure is equal to or less than the engagement determination value.

Therefore, in addition to the advantages (1) to (5) of the first embodiment, the third embodiment provides the following advantages.

(7) In the case where it is determined based on the operation state of the inching pedal whether the state has been switched to the driving force connection state in response to the clutch pressure (hydraulic pressure) in the pressure receiving chamber 42a, 43a of the clutch (the advancing clutch 42 and the reversing clutch 43), the detection result depends on the assembly accuracy of a detection section for detecting the operation state (for example, the inching switch 71 and the inching pedal position sensor 82). That is, if the clutch is determined to be engaged in the control procedure even if the clutch is not engaged, there is a time lag between the determination and the rev up of the engine 16. Thus, it is likely that the control for starting (the start control process shown in FIGS. 8 and 11) is not executed, and the vehicle starts abruptly. Also, if the clutch is determined to be disengaged even if the clutch is engaged in the control procedure, the control for starting is not executed in time. In this case, the vehicle is likely to be started abruptly. However, in this embodiment, the clutch pressures in the pressure receiving chambers 42a, 43a are directly detected to improve the detection accuracy and the determination accuracy, and whether the state has been switched to the driving force connection state is determined. Thus, the determination accuracy is improved, and the vehicle is further reliably prevented from abruptly starting.

A fourth embodiment of the present invention will now be described with reference to FIGS. 14 and 15. This embodiment may be applied to any of the first to third embodiments.

In this embodiment, when it is determined that the driving force is shifted from the driving force disconnection state to the driving force connection state (when the decision outcome of step S20 of a sudden start control process is positive), the engine speed M is monitored until a predetermined time elapses after the time of the determination. If the engine speed M reaches or surpasses the limitation engine speed Ma during the predetermined period from the time of the determination, the driving force is forcibly disconnected. In this embodiment, the predetermined period is set to 0.5 seconds.

FIGS. 14(a) to 14(d) show changes of the depression amount of the accelerator pedal 32, the depression amount of the inching pedal, the engine speed, and the vehicle speed when the driver removes a foot from one of the accelerator pedal 32 and the inching pedal 33 and puts it on the other. FIGS. 14(a) to 14(d) are correlated, and the horizontal axes represent a common temporal axis.

As shown in FIGS. 14(a) to 14(d), even if the accelerator pedal 32 is depressed, the engine speed and the vehicle speed do not increase in complete synchronization with the depression, but increase after a delay. Specifically, the depression of the accelerator pedal 32 first causes the engine speed to increase. Thereafter, the vehicle speed is increased. Therefore, if the clutch is engaged with the accelerator pedal 32 being depressed when the driver switches the pedals, the engine speed M at the engagement is possibly in the low engine speed region lower than the limitation engine speed Ma. In this embodiment, taking into consideration an increase delay of the engine speed M, the engine speed M is monitors until a predetermined period has elapsed.

Hereafter, the start control process executed by the CPU 54 of the vehicle control apparatus 52 will now be described with reference to FIG. 15. In FIG. 15, the same reference numerals are given to those steps that are the same as the corresponding steps in the start control process (FIG. 8) of the first embodiment. In the following, the redundant explanations for the same processes will be omitted or simplified, and different processes will mainly be described.

In the start control process shown in FIG. 15, the CPU 54 proceeds to step S42 when determining that the outcome of step S23 is negative. At step S42, the CPU 54 determines whether elapsed time from when the outcome of step S20 is determined to be positive has reached a predetermined period Ta. The CPU 54 of this embodiment has a timer function. When the decision outcome of step S20 is determined to be positive, the CPU 54 measures time from the time of the determination (time from when the driving force disconnection state is switched to the driving force connection state). If the decision outcome at step S42 is negative, the CPU 54 proceeds to step S22 and repeats the process from step S22. That is, the CPU 54 continuously determines the engine speed until the predetermined period Ta elapses. If the outcome of step S23 is determined to be positive before the predetermined period Ta elapses, the CPU 54 proceeds to step S24, and executes the subsequent procedure.

On the other hand, when the decision outcome of step S42 is negative, the engine speed M does not surpass the limitation engine speed Ma after the predetermined period Ta elapses (the engine 16 is not revved up). In this case, the CPU 54 ends the start control process. After ending the start control process, the CPU 54 resets the measured time to zero.

In this control, even if the engine speed M has not reached or surpassed the limitation engine speed M when the transmission 18 is shifted to the driving force connection state (at the instant of shifting), the starting of the vehicle is limited (forcible disconnection of the driving force and reduction of engine speed) when the engine speed M reaches or surpasses the limitation engine speed Ma during the predetermined period Ta.

Therefore, in addition to the advantages (1) to (5) of the first embodiment, the third embodiment provides the following advantages.

(8) During the predetermined period Ta, which includes the time (instant) at which the transmission 18 is shifted to the driving force connection state, the engine speed M is monitored. If the engine speed M reaches or surpasses the limitation engine speed Ma during the predetermined period Ta, the driving force is forcibly disconnected. Even if the driver instructs acceleration of the vehicle at the same time as the driver switches to the driving force connection state, the engine speed M is likely to be increased from the time of the switching to a speed equal to or greater than the limitation engine speed Ma. Therefore, by continuously determining the engine speed M from when the transmission 18 is switched to the driving force connection state until the predetermined period Ta elapses, unstable start is more reliably avoided.

A fifth embodiment of the present invention will now be described with reference to FIGS. 14 and 16. This embodiment may be applied to any of the first to third embodiments.

Figure 14A:
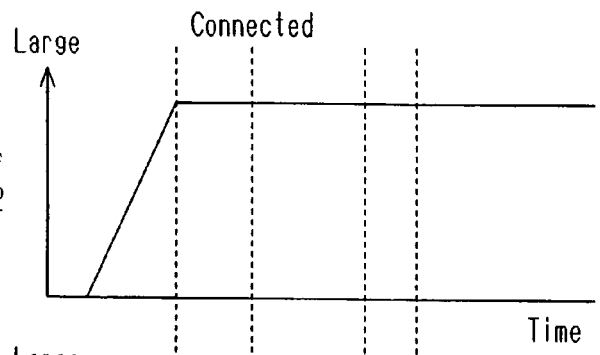
FIG. 14(a) to 14(d) are relational diagrams showing the relationship among the depression amount of the accelerator pedal, the depression amount of the inching pedal, the engine speed, and the vehicle speed.
Figure 14B:
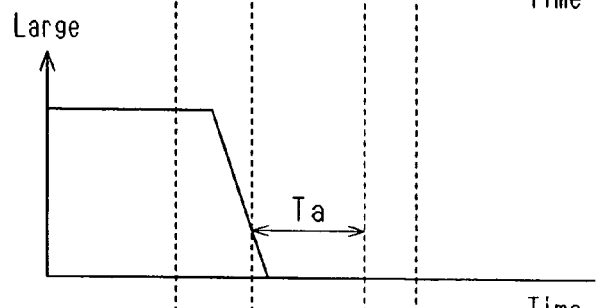
Figure 14C:
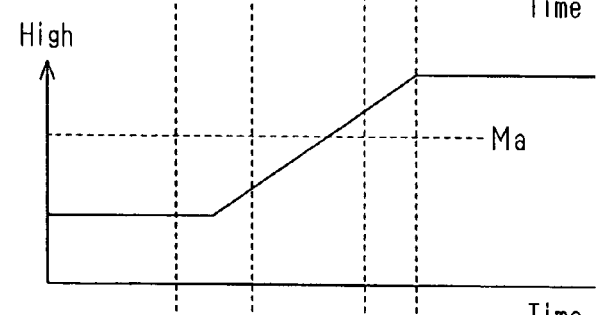
Figure 14D:
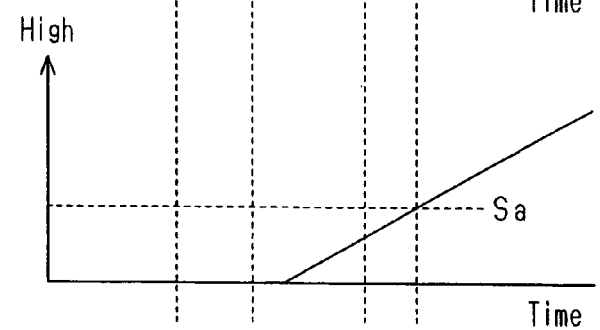

In this embodiment, when it is determined that the driving force is shifted from the driving force disconnection state to the driving force connection state (when the decision outcome of step S20 of a sudden start control process is positive), the engine speed M is monitored until the vehicle speed reaches a predetermined vehicle speed after the time of the determination. If the engine speed M reaches or surpasses the limitation engine speed Ma during the period from the time of the determination to when the vehicle speed reaches the predetermined vehicle speed, the driving force is forcibly disconnected. In this embodiment, the predetermined vehicle speed is set to 3 km/h to determine whether the starting needs to be limited in the low vehicle speed region. As shown in FIG. 14(d), even if the accelerator pedal 32 is depressed, the vehicle speed does not increase in a complete synchronization with the depression, but increases after a delay, like the engine speed. Therefore, if the clutch is engaged with the accelerator pedal 32 being depressed when the driver switches the pedals, the engine speed M at the engagement is possibly in the low engine speed region lower than the limitation engine speed Ma, and the vehicle speed is possibly in a low speed region. In this embodiment, taking into consideration an increase delay of the engine speed M and the vehicle speed, the engine speed M is monitors until a predetermined period has elapsed.

Hereafter, the start control process executed by the CPU 54 of the vehicle control apparatus 52 will now be described with reference to FIG. 16. In FIG. 16, the same reference numerals are given to those steps that are the same as the corresponding steps in the start control process (FIG. 8) of the first embodiment. In the following, the redundant explanations for the same processes will be omitted or simplified, and different processes will mainly be described.

In the start control process shown in FIG. 16, the CPU 54 proceeds to step S43 when determining that the outcome of step S23 is negative. At step S43, the CPU 54 receives a detection signal of the vehicle speed sensor 63, and obtains the vehicle speed. The CPU 54 receives the detection signal of the vehicle speed sensor 63 via the CPU 57 of the engine control apparatus 53. Subsequently, at step S44, the CPU 54 compares the vehicle speed obtained at step S43 (represented by S in FIG. 16) with a predetermined vehicle speed (represented by sa in FIGS. 14 and 16), and determines whether the vehicle speed S is greater than or equal to the predetermined vehicle speed Sa. If the decision outcome is negative, the CPU 54 proceeds to step S22 and repeats the process from step S22. That is, the CPU 54 continuously determines the engine speed until the vehicle speed S reaches the predetermined vehicle speed Sa. If the outcome of step S23 is determined to be positive before the vehicle speed S reaches the predetermined vehicle speed Sa, the CPU 54 proceeds to step S24, and executes the subsequent procedure.

On the other hand, when the decision outcome of step S44 is negative, the engine speed M does not surpass the limitation engine speed Ma even if the vehicle speed S has reached the predetermined vehicle speed Sa (the engine 16 is not revved up). In this case, the CPU 54 ends the start control process.

In this control, even if the engine speed M has not reached or surpassed the limitation engine speed M when the transmission 18 is shifted to the driving force connection state (at the instant of shifting), the starting of the vehicle is limited (forcible disconnection of the driving force and reduction of engine speed) when the engine speed M reaches or surpasses the limitation engine speed Ma before the vehicle speed reaches the predetermined vehicle speed Sa.

Therefore, in addition to the advantages (1) to (5) of the first embodiment, the present embodiment provides the following advantages.

(9) The engine speed M is monitored until the vehicle speed S reaches the predetermined vehicle speed Sa from the time (instant) at which the transmission 18 is shifted to the driving force connection state. If the engine speed M reaches or surpasses the limitation engine speed Ma before the vehicle speed S reaches the predetermined vehicle speed Sa, the driving force is forcibly disconnected. Even if the driver instructs acceleration of the vehicle at the same time as the driver switches to the driving force connection state, the engine speed M is likely to be increased from the time of the switching to a speed equal to or greater than the limitation engine speed Ma. Therefore, by continuously performing the determination from when the transmission 18 is switched to the driving force connection state until the vehicle speed S reaches the predetermined vehicle speed Sa, unstable start is more reliably avoided.

A sixth embodiment of the present invention will now be described with reference to FIGS. 6 and 10. This embodiment may be applied to any of the first to fifth embodiments.

In this embodiment, when the load state is changed while the forklift 10 is traveling, and the contents of limitation on the vehicle driving (the maximum vehicle speed value and the acceleration/deceleration value) are changed depending on the change of the load state, a control for suppressing a sudden change in the vehicle speed (acceleration and deceleration) is executed (hereafter, referred to as normalizing control). Changes in the load state include a case where the fork height is changed from a low fork height to a high fork height or from a high fork height to a low fork height, and a case where the tilt angle is changed from the rearward tilt range to the outside of the range or from the outside of the range into the range. In this embodiment, the CPU 57 of the engine control apparatus 53 executes the normalizing control. Such a sudden change in the vehicle speed occurs frequently when the forklift 10 is traveling with the accelerator pedal 32 fully depressed. For example, when the limitation state, in which the driving of the vehicle is limited, is shifted to the non-limitation state, in which no limitation is imposed, the forklift 10 is likely to be suddenly accelerated and become unstable since the limitation on the maximum vehicle speed or the acceleration/deceleration is cancelled. In contrast, when the non-limitation state is shifted to the limitation state, the forklift 10 is likely to be suddenly decelerated and become unstable since the limitation on the maximum vehicle speed or the acceleration/deceleration is imposed. When the contents of limitation are relaxed, the forklift 10 is likely to be suddenly accelerated and become unstable since the limitation on the maximum vehicle speed and the acceleration/deceleration is relaxed (that is, the maximum vehicle speed value is increased).

Hereafter, the contents of the normalizing control executed by the CPU 57 of the engine control apparatus 53 in this embodiment will be described. In this embodiment, the CPU 54 of the vehicle control apparatus 52 executes the limitation determining process shown in FIG. 7 as in the first embodiment.

The CPU 57 of the engine control apparatus 53 stores in the memory 58 the contents of limitation (the maximum vehicle speed value and the acceleration/deceleration value), which are instructed by limitation signals from the CPU 54 of the vehicle control apparatus 52. At this time, the CPU 57 stores in the memory 58 the contents of limitation instructed by limitation signals received in the previous control cycle and the contents of limitation instructed by limitation signals received in the current control cycle. The CPU 57 compares the contents of limitation of the previous control cycle stored in the memory 58 with the contents of limitation of the current control cycle, and determines whether there have been changes in the contents. Specifically, the CPU 57 determines whether the contents of limitation have been changed in response to a change in the fork height, and whether the contents of limitation have been changed in response to a change in the tilt angle. Changes in the contents of limitation in response to a change in the fork height include a change from the non-limitation state to the limitation state (hereafter, referred to as change patter P1) and a change from the limitation state to the non-limitation state (hereafter, referred to as change patter P2). Changes in the contents of limitation in response to a change in the tilt angle include changes in the maximum vehicle speed value and the acceleration/deceleration value in response to a change in the tilt angle from the rearward tilt range to the outside (hereafter, referred to as change patter P3), and changes the maximum vehicle speed value and the acceleration/deceleration value in response to a change in the tilt angle from the outside of the rearward tilt range into the rearward tilting range (hereafter, referred to as change patter P4).

Then, if there have no change in the contents of limitation on the vehicle driving, the CPU 57 adjusts the engine speed according to the contents of limitation of the current control cycle, thereby controlling the engine 16. Specifically, when the driving of the vehicle is not limited, the CPU 57 controls the throttle actuator 35 according to a detection signal (the amount of depression of the accelerator pedal 32) of the accelerator pedal position sensor 70 provided at the accelerator pedal 32, thereby adjusting the engine speed. When the driving of the vehicle is limited, the CPU 57 adjusts the engine speed using the engine speed adjustment data shown in FIG. 10 based on the maximum vehicle speed value and the acceleration/deceleration value stored in the memory 58.

On the other hand, when the contents of limitation on the driving of the vehicle have been changed, the CPU 57 determines which one of the change patterns P1 to P4 the change corresponds to. Then, the CPU 57 adjusts the engine speed according to a predetermined control set for each change pattern, thereby controlling the engine 16. If the change corresponds to the change pattern P1, the CPU 57 uses the maximum vehicle speed value instructed by the limitation signal as the maximum vehicle speed value, and the acceleration/deceleration level 1 as the acceleration/deceleration value instead of the acceleration/deceleration value (acceleration/deceleration level) instructed by the limitation signal. For example, even if the limitation signal instructs the maximum vehicle speed value of 15 km/h and the acceleration/deceleration level 4, the CPU 57 performs control using the acceleration/deceleration level 1. If the change corresponds to the change pattern P2, the CPU 57 cancels the limitation on the maximum vehicle speed value (does not limit the maximum vehicle speed value), while continuing to use the acceleration/deceleration level 1 as the acceleration/deceleration value.

If the change corresponds to the change patter P3, the CPU 57 performs control using the maximum vehicle speed value and the acceleration/deceleration value that are instructed by the limitation signal. If the change corresponds to the change pattern P4, the CPU 57 uses the maximum vehicle speed value instructed by the limitation signal as the maximum vehicle speed value, and the acceleration/deceleration level that is one degree lower than the acceleration/deceleration value (acceleration/deceleration level) instructed by the limitation signal. For example, in the case where the contents of limitation of the previous control cycle are the maximum vehicle speed value of 12 km/h and the acceleration/deceleration level 3, if the contents of limitation of the current control cycle are the maximum vehicle speed value of 15 km/h and the acceleration/deceleration level 4, the CPU 57 uses the maximum vehicle speed value of 15 km/h and the acceleration/deceleration level 3.

When limiting the acceleration/deceleration level according to the normalizing control as described above (when the acceleration/deceleration level has been changed), the CPU 57 sets the acceleration/deceleration level to a normal level according to the operation state of the accelerator pedal 32. That is, the CPU 57 monitors whether the ON operation of the accelerator pedal 32 is shifted to the OFF operation. When detecting that the ON operation of the accelerator pedal 32 has been shifted to the OFF operation, the CPU 57 restores the acceleration/deceleration level to the previous level. More specifically, if the change corresponds to the change pattern P1, the CPU 57 restores the acceleration/deceleration value corresponding to the acceleration/deceleration level 1 to the acceleration/deceleration value (the acceleration/deceleration level) instructed by the limitation signal. When the change corresponds to the change pattern P2, the CPU 57 cancels the setting of the acceleration/deceleration level, and does not limit the acceleration/deceleration. When the change corresponds to the change pattern P3, since the CPU 57 has not changed the acceleration/deceleration level, the CPU 57 maintains the current state. If the change corresponds to the change pattern P4, the CPU 57 restores the acceleration/deceleration value to the acceleration/deceleration value (the acceleration/deceleration level) instructed by the limitation signal.

Therefore, in addition to the advantages (1) to (5) of the first embodiment, this embodiment provides the following advantages.

(10) When the contents of limitation on the driving of the vehicle are changed, the acceleration/deceleration level is selected in accordance with the degree of the change, and the drive control is executed, accordingly. Therefore, when the contents of limitation are changed, the vehicle speed is prevented from being abruptly changed. That is, when the contents of limitation are changed, the forklift 10 is slowly accelerated or decelerated. As a result, the driving of the forklift 10 is prevented from being unstable when the contents of limitation are changed. That is, the forklift 10 is permitted to be driven in a stable manner. By executing the normalizing control of this embodiment, the stability of the forklift 10 is ensured both when the forklift 10 is started and traveling. Further, while the forklift 10 is traveling, the stability of the forklift 10 is ensured, which stability would not be achieved by simply controlling the maximum vehicle speed and the acceleration/deceleration. When the driving condition of the forklift 10 is changed, the driver is given a sufficient time for calmly dealing with such a change.

(11) In the normalizing control, when the driver performs the OFF operation of the accelerator pedal 32, the acceleration/deceleration level is restored to the normal level (the acceleration/deceleration level that corresponds to the load state). Thus, without complicating the operation of the driver, the limitation on the forklift 10 (the setting of the acceleration/deceleration level) is cancelled by the normalizing control.

A seventh embodiment of the present invention will now be described with reference to FIGS. 17 to 20. In the following embodiments, explanations of the same components of the already described embodiments will be omitted or simplified.

Figure 17:
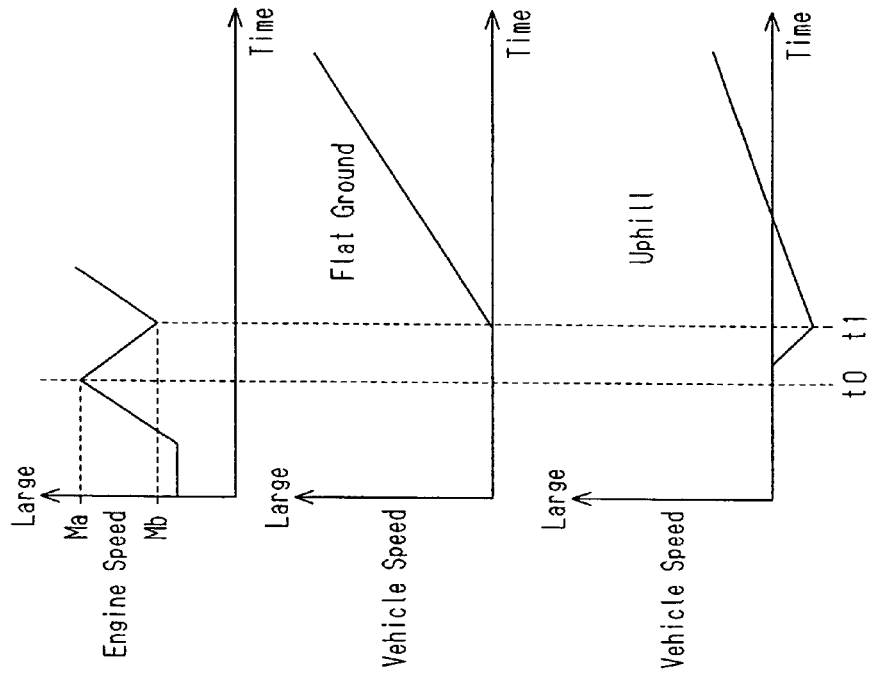
FIG. 17 is a relational diagram showing the relationship between the vehicle speed and the engine speed in a case where a control according to a seventh embodiment is not executed.
Figure 18:
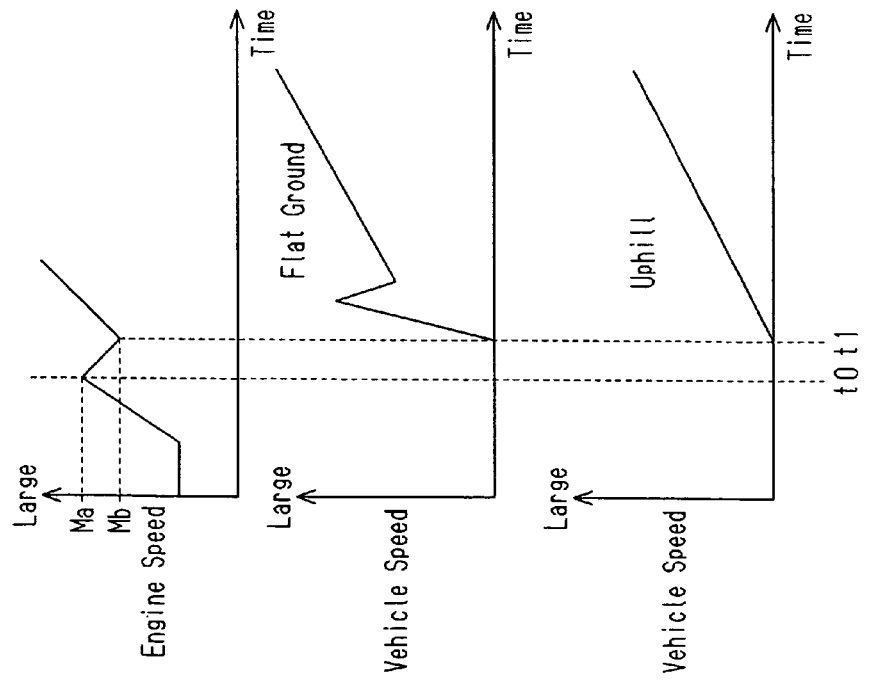
FIG. 18 is a relational diagram showing the relationship between the vehicle speed and the engine speed in a case where a control according to the seventh embodiment is not executed.

In the previous embodiments, the starting is assumed to be performed on a flat ground, and uphill starting is not considered. That is, when a sudden start prevention control is executed, reduction of the engine speed to a level equal to or less than a certain value (limitation canceling engine speed Mb) is detected, and the forklift is permitted to travel by canceling the driving force disconnection state and the engine speed reduction control state. However, if the limitation canceling engine speed Mb is set high to prevent roll back on an uphill road, there will be a problem in starting on a flat ground. That is, as shown in FIG. 17, after the sudden start prevention control is started at time t0 at which the engine speed is the limitation engine speed Ma, when the sudden start prevention control is ended at time t1 at which the engine speed drops to the limitation canceling engine speed Mb, there will be no roll-back on an uphill. However, the forklift 10 would be suddenly started on a flat ground. If the limitation canceling engine speed Mb is set low to prevent sudden start on a flat ground, there will be a problem in starting on an uphill. That is, as shown in FIG. 18, after the sudden start prevention control is started at time t0 at which the engine speed is the limitation engine speed Ma, when the sudden start prevention control is ended at time t1 at which the engine speed drops to the limitation canceling engine speed Mb, there will be no sudden start on a flat ground. However, the forklift 10 would roll back on an uphill. This embodiment prevents both of roll back at uphill start and sudden start on a flat ground.

The memory 55 of the vehicle control apparatus 52 stores an engine speed reduction canceling speed Mc in addition to the limitation engine speed Ma and the limitation canceling engine speed Mb. The engine speed reduction canceling speed Mc is set to be less (lower) than the limitation canceling engine speed Mb. The limitation canceling engine speed Mb is set higher than an engine speed that does not cause the forklift 10 to suddenly start on a flat ground, and the engine speed reduction canceling speed Mc is set lower than the limitation canceling engine speed Mb. The limitation canceling engine speed Mb and the engine speed reduction canceling speed Mc are values obtained by taking into consideration the load state (the contents of limitation during driving) through experiments (simulations) to find out the degree of reduction of engine speed that maintains the stability of the vehicle at the start. Therefore, the limit canceling engine speed Mb and the engine speed reduction canceling speed Mc vary depending on the type of the forklift 10. In this embodiment, for example, the limitation engine speed Ma is 1700 rpm, the limitation canceling engine speed Mb is 1500 rpm, and the engine speed reduction canceling speed Mc is 1200 rpm.

The CPU 54 of the vehicle control apparatus 52 executes in the start control process the same process as those of the previous embodiments to step S23. The memory 55 stores a control program for performing a flowchart shown in FIG. 19. In the flowchart a section up to step S24 is the same as that of FIG. 8, and part thereof is omitted.

Figure 19:
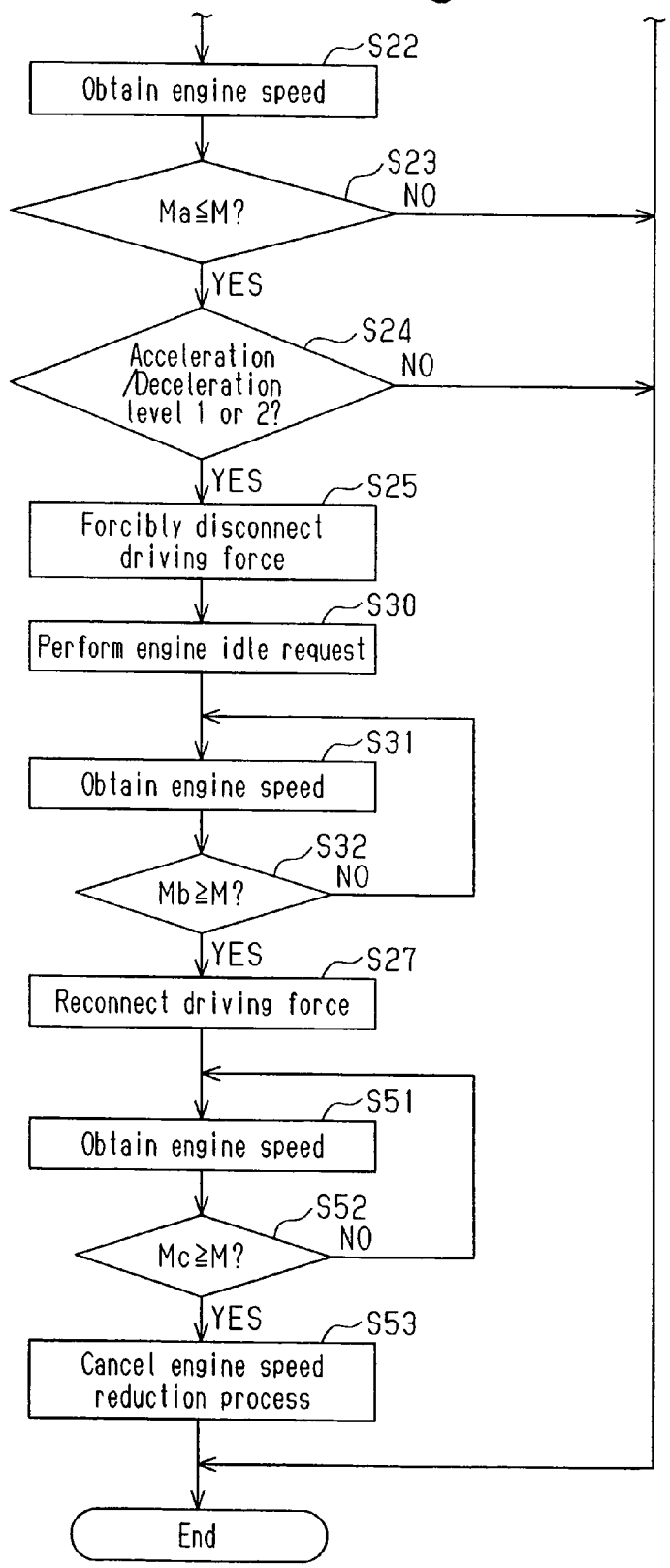
FIG. 19 is a flowchart showing a start control process according to the seventh embodiment.

A starting process of this embodiment will be described with reference to FIG. 19. In FIG. 19, the same reference numerals are given to those steps that are the same as the corresponding steps in the start control process (FIG. 8) of the first embodiment. In the following, the redundant explanations for the same processes will be omitted or simplified, and different processes will mainly be described.

In the start control process shown in FIG. 19, when the decision outcome of step S23 is positive, the CPU 54 of the vehicle control apparatus 52 determines whether the acceleration/deceleration level is [1] or [2] at step S24. If the decision outcome at step S24 is positive, the CPU 54 forcibly disconnects the driving force at step S25. At step S25, the CPU 54 controls the advancing electromagnetic valve 44 and the reversing electromagnetic valve 45 as in the first embodiment, thereby disconnecting the driving force. After disconnecting the driving force at step S25, the CPU 54 executes the engine rev down process. That is, at step S30, the CPU 54 executes an engine idle request (a request for reducing the speed of the engine 16). When receiving the engine idle request signal from the CPU 54, the CPU 57 controls the throttle actuator 35, thereby adjusting the speed of the engine 16. Regardless of the detection result of the accelerator pedal position sensor 70 (the depression amount of the accelerator pedal 32), the CPU 57 controls the engine 16 to reduce the engine speed.

After step S30, the CPU 54 obtains the engine speed at step S31. Then, the CPU 54 compares the engine speed obtained at step S32 (represented by M in FIG. 19) with a predetermined limitation canceling engine speed (represented by Mb in FIG. 19), and determines whether the engine speed M is less than or equal to the limitation canceling engine speed Mb. The limitation canceling engine speed Mb is set lower than the limitation engine speed Ma. In this embodiment, the limitation canceling engine speed Mb is set to 1500 rpm. If the decision outcome at step S32 is negative (Mb<M), the CPU 54 proceeds to step S31 and repeats the process from step S31. On the other hand, if the decision outcome at step S32 is positive (Mb≧M), the CPU 54 proceeds to step S27. At step S27, the CPU 54 cancels the state of disconnection of the driving force, thereby reconnecting the driving force. At step S27, the CPU 54 controls the advancing electromagnetic valve 44 or the reversing electromagnetic valve 45, thereby reconnecting the driving force, as in the previous embodiments.

In the first embodiment, when the decision outcome of step S32 is positive (Mb≧M), the CPU 54 ends the rev down process to reconnect the driving force. In contrast, the CPU 54 continues the rev down process in this embodiment. After step S27, the CPU 54 proceeds to step S51. At step S51, the CPU 54 obtains the engine speed. Then, the CPU 54 compares the engine speed obtained at step S52 (represented by M in FIG. 19) with a predetermined engine speed reduction canceling speed (represented by Mc in FIG. 19), and determines whether the engine speed M is less than or equal to the engine speed reduction canceling speed Mc.

If the decision outcome at step S52 is negative (Mc<M), the CPU 54 proceeds to step S51 and repeats the process from step S51. On the other hand, if the decision outcome at step S52 is positive (Mc≧M), the CPU 54 proceeds to step S53 and cancels the engine speed reduction processing state. That is, the CPU 54 ends the engine rev down process. After step S53, the CPU 54 ends the start control process.

Figure 20:
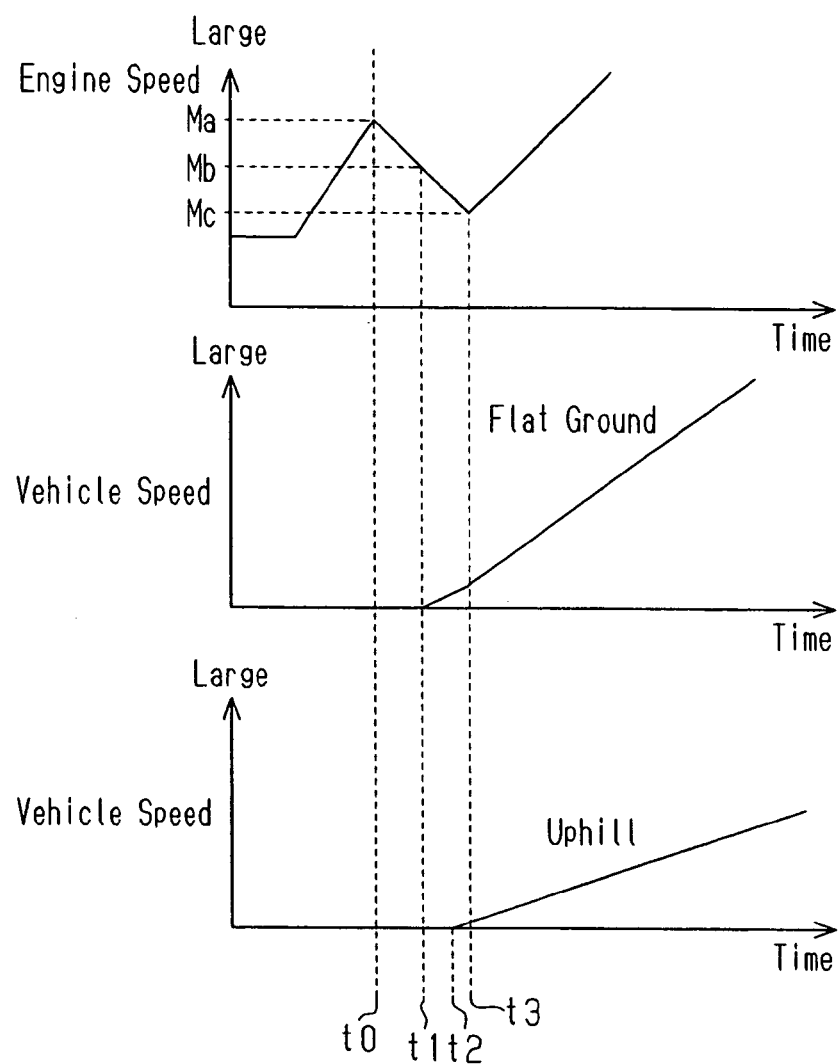
FIG. 20 is a relational diagram showing the relationship between the vehicle speed and the engine speed, showing an operation of the seventh embodiment.

As a result, changes in the speed of the forklift 10 are as represented by FIG. 20 when the driving force disconnection and the engine speed reduction control are canceled in the sudden start prevention control. That is, when the forklift 10 is started on a flat ground, the driving force is disconnected at time t0. Thereafter, the engine speed is reduced to the limitation canceling engine speed Mb. At time t1, where the disconnection of the driving force is canceled, the forklift 10 is started at a vehicle speed that is not a speed of a sudden start. Thereafter, the engine speed is lowered to the engine speed reduction canceling speed Mc, and the engine speed reduction control is canceled at time t3. From time t3, the vehicle speed is increased at a greater acceleration.

At an uphill start, the engine speed drops to the limitation canceling engine speed Mb, and the forklift 10 starts traveling at time t2, which is a certain period after time t1 of cancellation of disconnection of the driving force. That is, the forklift 10 starts at timing delayed compared to the case of a flat ground. Thereafter, the engine speed is lowered to the engine speed reduction canceling speed Mc and the engine speed reduction control is canceled at time t3. After time t3, the vehicle speed is gradually increased at a lower acceleration than the case of a flat ground.

In addition to the advantages (1) to (5) of the first embodiment, this embodiment provides the following advantages.

(12) When the disconnection control section (the CPU 54) disconnects the driving force, the engine speed control section (CPU 54) lowers the engine speed below the limitation canceling engine speed Mb, which is lower than the limitation engine speed Ma. When disconnecting the driving force, the disconnection control section cancels the disconnection of the driving force when the engine speed drops to the limitation canceling engine speed Mb, but continues the engine speed reduction control. When the engine speed falls to or below the engine speed reduction canceling speed Mc lower than the limitation canceling engine speed Mb, the engine speed control section cancels the engine speed reduction control. Thus, even if the limitation canceling engine speed Mb is set higher than an engine speed that does not cause the forklift 10 to start suddenly, the forklift 10 is prevented from starting suddenly at a speed corresponding to the limitation canceling engine speed Mb on a flat ground. Also, roll-back on a hill is prevented.

Figure 21:
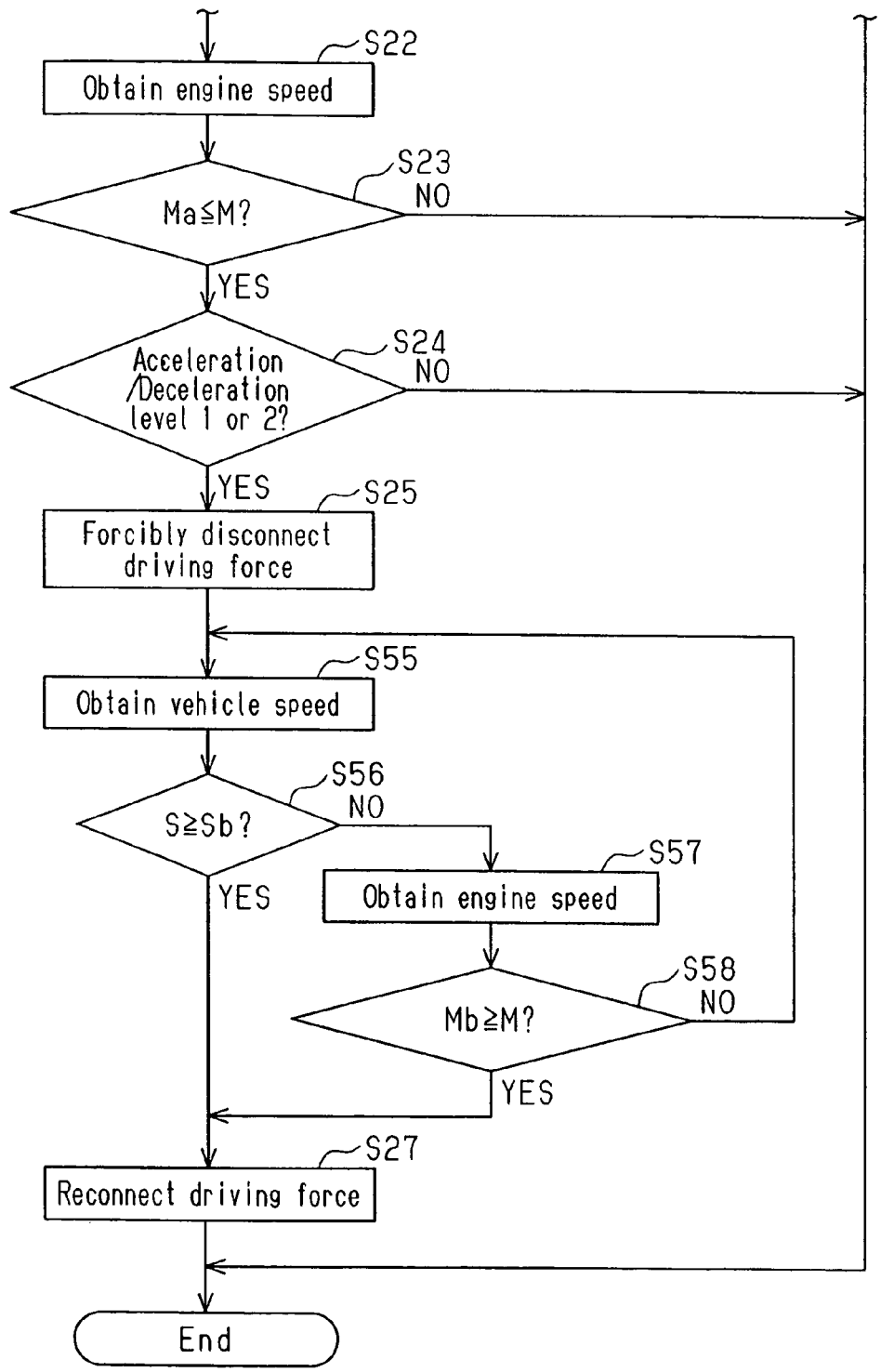
FIG. 21 is a flowchart showing a start control process according to an eighth embodiment.

An eighth embodiment of the present invention will now be described with reference to FIGS. 21 to 23. This embodiment is greatly different from the seventh embodiment in that, in the sudden start prevention control (start control), conditions (factors) for canceling the disconnection of the driving force include the vehicle speed of the forklift 10 other than the engine speed, and that the engine speed reduction control state is cancelled at the same time when the disconnection of the driving force is cancelled. Other than these differences, the eighth embodiment is the same as the seventh embodiment, and explanations of the same components of the already described embodiments will be omitted or simplified.

The CPU 54 of the vehicle control apparatus 52 executes the same process up to step S25 in the start control process. The memory 55 stores a control program for executing a flowchart shown in FIG. 21. In the flowchart a section up to step S25 is the same as that of FIG. 19, and part thereof is omitted.

As in the seventh embodiment, the CPU 54 disconnects the driving force at step S25. After disconnecting the driving force at step S25, the CPU 54 receives a detection signal of the vehicle speed sensor 63, and obtains the vehicle speed. The CPU 54 receives the detection signal of the vehicle speed sensor 63 via the CPU 57 of the engine control apparatus 53. Subsequently, at step S56, the CPU 54 compares the vehicle speed obtained at step S55 (represented by S in FIG. 21) with a limitation canceling vehicle speed (represented by Sb in FIG. 21), and determines whether the vehicle speed S is greater than or equal to the limitation canceling vehicle speed Sb. If the decision outcome is positive (S≧Sb), the CPU 54 proceeds to step S27. At step S27, the CPU 54 cancels the state of disconnection of the driving force, thereby reconnecting the driving force. At step S27, the CPU 54 controls the advancing electromagnetic valve 44 or the reversing electromagnetic valve 45, thereby reconnecting the driving force, as in the previous embodiments.

On the other hand, if the decision outcome at step S56 is negative (S<Sb), the CPU 54 proceeds to step S57 and obtains the engine speed. Then, the CPU 54 compares the engine speed obtained at step S57 (represented by M in FIG. 21) with a predetermined limitation canceling engine speed (represented by Mb in FIG. 21), and determines whether the engine speed M is less than or equal to the limitation canceling engine speed Mb. The limitation canceling engine speed Mb is a value that is lower than the limitation engine speed Ma does not cause the forklift 10 to suddenly start on a flat ground. In this embodiment, the limitation canceling engine speed Mb is set to 1500 rpm.

If the decision outcome at step S58 is negative (Mb<M), the CPU 54 proceeds to step S55 and repeats the process from step S55. On the other hand, if the decision outcome at step S58 is positive (Mb≧M), the CPU 54 proceeds to step S27. At step S27, the CPU 54 cancels the state of disconnection of the driving force, thereby reconnecting the driving force.

Figure 22:
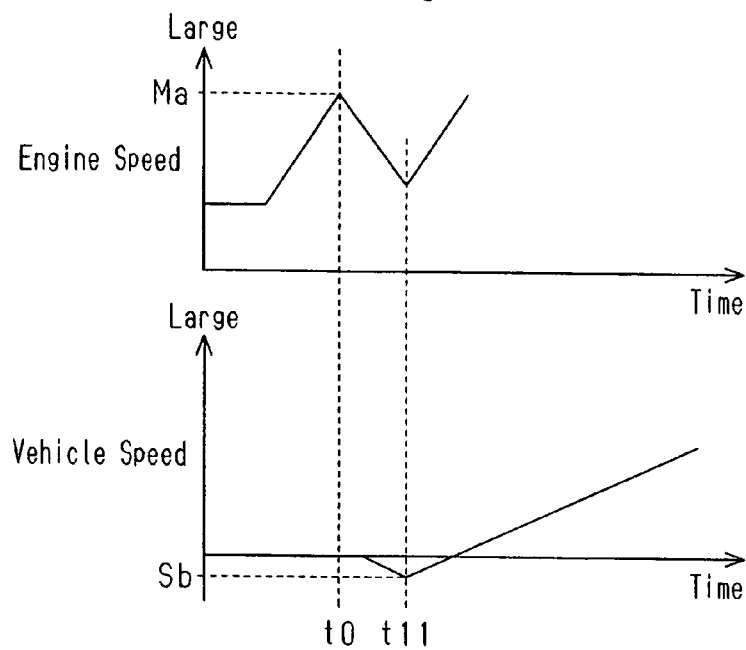
FIG. 22 is a relational diagram showing the relationship between the vehicle speed and the engine speed, showing an operation on a gentle slope according to the eighth embodiment.

As a result, when the sudden start prevention control is executed on a gentle uphill, changes in the speed of the forklift 10 due to disconnection and connection of the driving force are as represented by FIG. 22. That is, after the driving force is disconnected at time t0, the engine speed is lowered and the forklift 10 rolls back. At time t11, the disconnection of the driving force is canceled when the vehicle speed becomes the limitation canceling vehicle speed Sb. The forklift 10 starts accordingly. As a result, roll back is suppressed.

Figure 23:
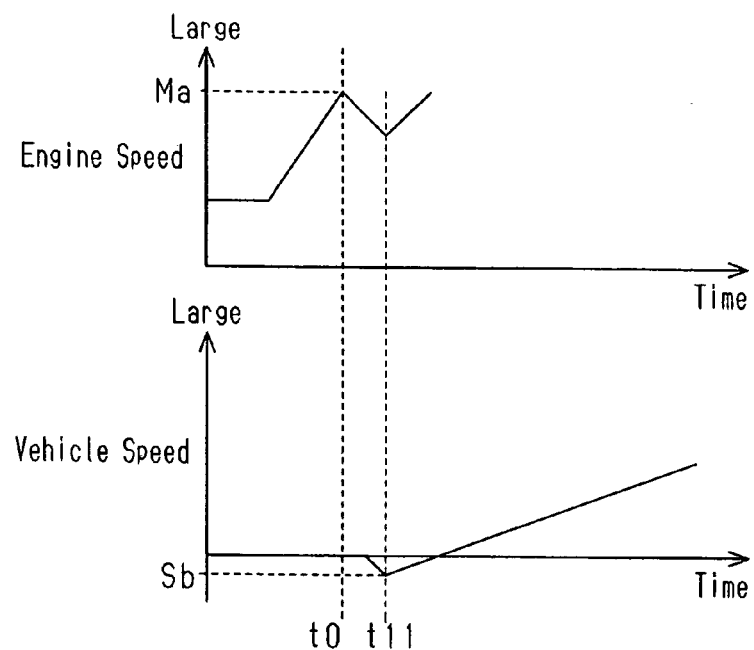
FIG. 23 is a relational diagram showing the relationship between the vehicle speed and the engine speed, showing an operation on a steep slope according to the eighth embodiment.

As a result, when the sudden start prevention control is executed on a steep uphill, changes in the speed of the forklift 10 due to disconnection and connection of the driving force are as represented by FIG. 23. That is, after the driving force is disconnected at time t0, the engine speed is lowered and the forklift 10 rolls back. At time t11, the disconnection of the driving force is canceled when the vehicle speed becomes the limitation canceling vehicle speed Sb. The forklift 10 starts accordingly. In this case, the period until the vehicle speed of the vehicle speed 10 falls to or below the limitation canceling vehicle speed Sb due to roll back is short, and the engine speed at time t11 is higher than the case of a gentle uphill. The amount of roll back of the forklift 10 is reduced.

Also, at the start on a flat ground, there is no roll back. Thus, if the driving force is disconnected, the vehicle speed of the forklift 10 does not reach the limitation canceling vehicle speed Sb until the disconnection is canceled. Thus, the disconnection of the driving force is not canceled based on the vehicle speed S. When the engine speed M falls to or below the limitation canceling engine speed Mb, the disconnection of the driving force is cancelled, and the driving force is reconnected. Since the limitation canceling engine speed Mb is set to a value that does not cause the forklift 10 to start suddenly on a flat ground, the forklift t10 is prevented from starting suddenly.

In addition to the advantages (1) to (5) of the first embodiment, the present embodiment provides the following advantages.

(13) In the case where the disconnection control section (the CPU 54) forcibly disconnects the driving force, when the vehicle speed reaches or surpasses the predetermined limitation canceling vehicle speed Sb, or when the engine speed falls to or below the limitation canceling engine speed Mb, which is lower than the limitation engine speed, the disconnection of the driving force is cancelled. Therefore, even on a steep uphill, roll back at the start is suppressed, and a sudden start on a flat ground is prevented. The forklift 10 is thus started in a stable manner. Also, at the same time as canceling the disconnection of the driving force, the engine speed reduction control is ended. Thus, the control process is simplified compared to a case where the cancellation of the driving force disconnection and the end of the engine speed reduction control are executed according to different conditions.

The above illustrated embodiment may be modified as follows.

Although the illustrated embodiments are applied to a torque converter type forklift 10 (torque converter vehicle), the present invention may applied to clutch type forklift (clutch vehicle) or Hydrostatic Transmission vehicles (HST vehicle). In the case of an MT vehicle, for example, as in the illustrated embodiments, the clutch, which forms a transmission, is shifted from the engaged state to the disengaged state in the disconnection control, thereby forcibly disconnecting the transmission of the driving force. In the case of an HST vehicle, for example, the transmission of the driving force is forcibly disconnected by disconnecting a hydraulic path between a hydraulic pump and a hydraulic motor forming a transmission in the disconnection control.

In the illustrated embodiments, the parameters used in the determination whether the maximum vehicle speed and the acceleration/deceleration should be limited, and the computation of the maximum vehicle speed and the acceleration/deceleration may be changed. For example, the maps may be configured for performing the determination based on the fork height and the load weight, and for computing the maximum vehicle speed and the acceleration/deceleration. In the necessity determining data shown in FIG. 4, the regions of the fork height and load weight may be segmented into smaller regions to provide two or more limitation regions. In this case, the vehicle speed computation data shown in FIG. 5 and the acceleration/deceleration computation data shown in FIG. 6 are provided for each of the limitation regions, so that data for computing the maximum vehicle speed value and the acceleration/deceleration value is changed for each limitation region. When segmenting the regions of the fork height, the mast assembly 19 may be provided with two or more limit switches for detecting the fork height. Alternatively, the mast assembly 19 may be provided with a reel sensor for continuously detecting the fork height.

In the illustrated embodiments, it may be configured that the advancing electromagnetic valve 44 and the reversing electromagnetic valve 45 are fully closed when the current to the solenoids is zero, and are fully open when a current is supplied to the solenoids.

In the illustrated embodiments, the advancing relay circuit 60 and the reversing relay circuit 61 may be formed by normally-open contacts instead of normally-closed contacts. In the case where normally-open contacts are used, the advancing electromagnetic valve 44 and the reversing electromagnetic valve 45 are energized when the normally-open contacts are closed, and de-energized when the contacts are open.

In the illustrated embodiments, the structures of the advancing clutch 42 and the reversing clutch 43 may be changed. That is, it may be configured that an increase in the clutch pressure of each pressure receiving chamber 42a, 43a increases the engaging force, and a decrease in the clutch pressure reduces the engaging force.

In the illustrated embodiments, a bypass passage may be provided on a supply path for supplying hydraulic oil to the advancing clutch 42 and the reversing clutch 43. In this case, when forcibly disconnecting the driving force, hydraulic oil may be supplied to the advancing clutch 42 or the reversing clutch 43 through the bypass passage by switching the supply path. Also, in the configuration where the engaging force is increased by increasing the clutch pressure of the advancing clutch 42 and the reversing clutch 43, the driving force may be forcibly disconnected by blocking the supply passage for switching the flow of hydraulic oil.

The illustrated embodiments may be configured that the vehicle speed when the driving force disconnection state is switched to the driving force connection state is detected, and the engine speed control and the disconnection control are executed when the detected vehicle speed is equal to or less than a predetermined threshold vehicle speed. In this case, the threshold vehicle speed is set to, for example, 3 km/h, which is in a low speed region. According to this configuration, if an operation is performed while the forklift 10 is traveling (at a high speed) for disconnecting or connecting the driving force, the engine speed control and the disconnection control are not executed. This ensures the driving stability. That is, the engine speed control and the disconnection control can be executed only at the start of the forklift 10, so that the vehicle is prevented from being unstable while it is traveling.

In the illustrated embodiments, when limiting the acceleration/deceleration, the CPU 54 of the vehicle control apparatus 52 may send a signal indicating the acceleration/deceleration level to the engine control apparatus 53 instead of the limited acceleration/deceleration value.

In the illustrated embodiments, the engine speed used in the start control process may be computed based on a detection value of the accelerator pedal position or the throttle opening degree. The process may be executed using the accelerator pedal position or the throttle opening degree instead of the engine speed. In this case, even if the forklift 10 is not provided with the engine speed sensor 62, the control can be executed by detecting the acceleration pedal position and the throttle opening degree with the minimum required sensors (detecting section) for the engine control.

In the first embodiment, when the load state is particularly harsh (in the first embodiment, when the acceleration/deceleration level is [1] or [2]), the driving force is disconnected and the engine speed is reduced. Instead of this control, when the driving of the vehicle, such as the maximum vehicle speed and the acceleration/deceleration, needs to be limited, the driving force may be disconnected and the engine speed may be reduced regardless of the load state.

The first embodiment may be configured that, when the load state is particularly harsh, the driving force is disconnected and the engine speed is lowered, and that, in other conditions, the forklift 10 is start without executing the engine speed control and the disconnection control. For example, in the first embodiment, even if the acceleration/deceleration level [3] or [4] corresponds to the state where the forklift 10 is carrying a load, no limitation needs to be placed at the start as long as the load state allows the forklift 10 to be stably started.

In the first embodiment, when the driving force is forcibly disconnected, the driving force may be reconnected depending on the time required for the engine speed M to drop to or below the limitation canceling engine speed Mb. The required time is computed through simulations. In the first embodiment, when the driving force is forcibly disconnected, the time required for the engine speed drops to or below the limitation canceling engine speed Mb may be computed according to the engine speed at the time of the disconnection, and the driving force may be reconnected when the required time elapses. For example, in the case of an engine speed M1, the driving force is reconnected when a period T1 has elapsed. In the case of an engine speed M2 (M2<M1), the driving force is restored when a period T2 (T2<T1) has elapsed. In this configuration, when the engine speed is in a high speed region, the driving force disconnection state is cancelled gradually. On the other hand, when the engine speed is in a low speed region, the driving force disconnection state is cancelled immediately. Thus, the driving stability and the operability of the forklift 10 are both ensured.

In the first embodiment, the map data for adjusting the engine speed (the engine speed adjustment data) is stored in the memory 58. However, instead of referring to the map data, the CPU 57 may calculate the adjustment amount of the engine speed using a predetermined arithmetic expression based on information sent to the CPU 57 (the maximum vehicle speed value, the acceleration/deceleration value, and the vehicle speed).

In the first, second, fourth, fifth, and sixth embodiments, whether the driving force disconnection state has been switched to the driving force connection state may be determined based on an operation of the advance/reverse lever 31 or the brake pedal 34. In a case where the determination is performed based on an operation of the advance/reverse lever 31, it is determined that the driving force disconnection state has been switched to the driving force connection state when the advance/reverse lever 31 is shifted from the neutral position [N] to the advance position [F] or to the reverse position [R]. In a case where the determination is performed based on an operation of the brake pedal 34, it is determined that the driving force disconnection state has been switched to the driving force connection state when the ON operation of the brake pedal 34 is shifted to the OFF operation. In the first, second, fourth, fifth, and sixth embodiments, the determination is performed based on operation of the inching pedal 33. However, the determination may be performed based on operation of an arbitrary combination of any of the inching pedal 33, the advance/reverse lever 31, and the brake pedal 34. For example, it may be determined that the driving force disconnection state has been switched to the driving force connection state when the advance/reverse lever 31 is shifted from the neutral position [N] to the advance position [F] or to the reverse position [R], and the OFF operation of the inching pedal 33 is shifted to the ON operation.

In the first, second, fourth, fifth, and sixth embodiments, the depression amount (pedal stroke amount) of the inching pedal 33 may be detected, and the engagement or disengagement of the clutch may be detected based on the detection result.

In the second embodiment, when the driving force is forcibly disconnected, the driving force may be reconnected when the engine speed M drops to or below the limitation canceling engine speed Mb. In the second embodiment, the vehicle control apparatus 52 does not make an engine idle request to the engine control apparatus 53 when the driving force is forcibly disconnected. Thus, in order to reduce the engine speed, the driver needs to perform the OFF operation of the accelerator pedal 32. Accordingly, the engine speed is reduced.

In the second embodiment, after the driving force is forcibly disconnected, the driving force may be reconnected when the driver switches the driving force connection state to the driving force disconnection state. In this case, the driver needs to perform the ON operation of the inching pedal 33, or shift the advance/reverse lever 31 to the neutral position [N].

In the third embodiment, the connection determination value and the disconnection determination value may be merged.

The predetermined period Ta of the fifth embodiment and the predetermined vehicle speed Sa of the sixth embodiment may be changed.

In the sixth embodiment, the acceleration/deceleration level that is selected when the contents of limitation are changed may be changed. That is, to avoid sudden acceleration or deceleration, an acceleration/deceleration level that reduces the acceleration/deceleration compared to the normal level is selected.

The sixth embodiment may be configured that the CPU 54 of the vehicle control apparatus 52 determines whether the contents of limitation have been changed, and that, in accordance with the determination result, the CPU 54 instructs the maximum vehicle speed value and the acceleration/deceleration value to the CPU 57 of the engine control apparatus 53. The CPU 57 performs control according to the instruction.

In the seventh embodiment, when disconnecting the driving force, the CPU 54 may cancel the disconnection of the driving force not when the engine speed falls to or below the limitation canceling engine speed M, but when a period required for the engine speed to fall to or below the limitation canceling engine speed Mb has elapsed. The period is obtained through experiments (simulations) in advance. Also, it may be configured that the engine speed reduction control state by the engine speed control section may be canceled (ended) not when the engine speed falls to or below the engine speed reduction canceling speed Mc, but when a period required for the engine speed to fall to or below the engine speed reduction canceling speed Mc has elapsed.

In the seventh embodiment, the conditions for canceling the disconnection state of the driving force may be met when the engine speed is reduced to a value less than or equal to the limitation canceling engine speed Mb or when time required for the engine speed to fall to or below the limitation canceling engine speed Mb has elapsed.

In the eighth embodiment, when disconnecting the driving force, the CPU 54 may cancel the disconnection of the driving force not when the engine speed falls to or below the limitation canceling engine speed M, but when a period required for the engine speed to fall to or below the limitation canceling engine speed Mb has elapsed.

In the seventh embodiment, when the CPU 54 disconnects the driving force, the conditions for canceling the driving force disconnection may include the vehicle speed being greater than or equal to the limitation canceling vehicle speed Sb. That is, the CPU 54 may cancel the disconnection of the driving force when the engine speed falls to or below the limitation canceling engine speed Mb or when the vehicle speed reaches or surpasses the limitation canceling vehicle speed Sb. In this case, even if the forklift 10 is on a slope for which the limitation canceling engine speed Mb is not suitable, the start control process is favorably executed.

The amount of current to the solenoids of the advancing clutch 42 and the reversing clutch 43 may be adjustable, such that the clutches are controlled according to three settings, which are disengaged state (disconnected state), partially engaged state, and complete engaged state. In the seventh embodiment, when canceling the disconnection of the driving force, the driving force may be transmitted through a partially engaged clutch. In this case, when the engine speed falls to or below the engine speed reduction canceling speed Mc, the clutch is fully engaged.

In the illustrated embodiments, the control for forcibly disconnecting the driving force is executed based on the load state and the engine speed at the time of switching from the driving force disconnection state to the driving force connection state. However, the control may be executed based on one of the load state and he engine speed. For example, if the load state at the time of shifting from the driving force disconnection state to the driving force connection state requires that the driving of the vehicle be limited, the driving force is forcibly disconnected. That is, even if the engine 16 has not been revved up at the start of the forklift 10, the starting is likely to be unstable due to the load state, for example, a high fork height. Therefore, by forcibly disconnecting the driving force according to the load state, the vehicle is prevented from being started under conditions that is likely to make the driving unstable. By disconnecting the driving force, the driver is urged to change the load state (for example, to lower the fork height). Also, since the forklift 10 runs with a load, care must be taken particularly when the forklift 10 is started so that the running does not become unstable. Therefore, even if the load state corresponds to a low fork height and a light load, the forklift 10 is suddenly started if the engine 16 has been revved up at the start, which is likely to cause the running to be unstable. Therefore, by forcibly disconnecting the driving force according to the engine speed, the vehicle is prevented from being started under conditions that is likely to make the driving unstable. By disconnecting the driving force, the driver is urged to change the operating state of the accelerator pedal 32 (for example, to reduce the depression amount).

The invention claimed is:

1. A drive control apparatus for a forklift,
wherein the forklift includes a vehicle body, a drive wheel provided to the vehicle body, an engine, a power transmission mechanism interposed between the engine and the drive wheel, and a loading attachment that is provided at a front portion of the vehicle body and mounts a load, and wherein the power transmission mechanism is switchable between a connection state for transmitting power of the engine to the drive wheel and a disconnection state for not transmitting the power of the engine to the drive wheel, wherein the forklift travels using the power of the engine as a driving force, the drive control apparatus comprising:
a connection determining section that determines whether the power transmission mechanism is switched from the disconnection state to the connection state in response to an operation by a driver;
a load determining section that determines a load state related to the loading attachment; and
a disconnection control section, wherein, in a case where the connection determining section determines switching to the connection state, if the load state determined by the load determining section requires that the driving of the vehicle body be limited, the disconnection control section forcibly disconnects the transmission of the driving force to the drive wheel.

2. The drive control apparatus according to claim 1,
wherein the power transmission mechanism includes a clutch,
wherein the vehicle body further includes a drive instructing section that instructs a driving direction of the vehicle body in response to an operation by the driver, an inching operation section that continuously changes the state of the clutch between engagement and disengagement in response to an operation by the driver, and a braking operation section that applies braking force to the vehicle body in response to an operation by the driver,
wherein the drive instructing section is configured to be capable of selectively instructing any one of an advancing state, a reversing state, and non-driving state where the drive instructing section neither the advancing state nor the reversing state, wherein, when the drive instructing section is operated to instruct the advancing state or the reversing state from the non-driving state, the disconnection state is switched to the connection state,
wherein, when an ON operation of the inching operation section is performed, the clutch is actuated to be disengaged, when an OFF operation of the inching operation section is performed, the clutch is actuated to be engaged, and wherein the inching operation section is operated from the ON operation to the OFF operation, the disconnection state is switched to the connection state,
wherein, when an ON operation of the braking operation section is performed, the braking force is applied, when an OFF operation of the braking operation section is performed, the braking force is not applied, and wherein the braking operation section is operated from the ON operation to the OFF operation, the disconnection state is switched to the connection state, and
wherein the connection determining section determines whether switching to the connection state has been performed based on the operating state of at least one of the drive instructing section, the inching operation section, and the braking operation section.

3. The drive control apparatus according to claim 1,
wherein the power transmission mechanism includes a hydraulic clutch having a pressure receiving chamber, the clutch is continuously changed between engagement and disengagement in accordance with a hydraulic pressure in the pressure receiving chamber,
wherein the clutch is provided with a hydraulic pressure detecting section for detecting the hydraulic pressure in the pressure receiving chamber, and
wherein the connection determining section determines whether switching to the connection state has been performed based on the hydraulic pressure detected by the hydraulic pressure detecting section.

4. The drive control apparatus according to claim 1, further comprising an engine speed determining section that determines an engine speed, wherein a limitation engine speed is set higher than at least an idle speed of the engine,
wherein, in a case where the connection determining section determines switching to the connection state, if the load state determined by the load determining section requires that the driving of the vehicle body be limited and the engine speed determined by the engine speed determining section is equal to or greater than the limitation engine speed, the disconnection control section forcibly disconnects the transmission of the driving force to the drive wheel.

5. The drive control apparatus according to claim 4,
wherein a limitation canceling engine speed is set lower than the limitation engine speed, and a reduction canceling engine speed is set lower than the limitation canceling engine speed,
wherein the drive control apparatus further comprises an engine speed control section that reduces the engine speed to or below the limitation canceling engine speed when the disconnection control section disconnects the driving force, wherein it takes a predetermined first period for the engine speed control section to reduce the engine speed to or below the limitation canceling engine speed, and it takes a predetermined second period for the engine speed control section to reduce the engine speed to or below the reduction canceling engine speed,
wherein the disconnection control section cancels the forcible disconnection of the driving force when the engine speed falls to or below the limitation canceling engine speed in the disconnection state or when the first period has elapsed, and
wherein the disconnection control section cancels the engine speed reduction control by the engine speed control section when the engine speed falls to or below the reduction canceling engine speed or when the second period has elapsed.

6. The drive control apparatus according to claim 4,
wherein a limitation canceling engine speed is set lower than the limitation engine speed,
wherein the disconnection control section cancels the forcible disconnection of the driving force when a vehicle speed reaches or surpasses a predetermined limitation canceling vehicle speed in the disconnection state or when the engine speed falls to or below the limitation canceling engine speed.

7. The drive control apparatus according to claim 4,
wherein a limitation canceling engine speed is set lower than the limitation engine speed, and a reduction canceling engine speed is set lower than the limitation canceling engine speed,
wherein the drive control apparatus further comprises an engine speed control section that reduces the engine speed to or below the limitation canceling engine speed when the disconnection control section disconnects the driving force, wherein it takes a predetermined first period for the engine speed control section to reduce the engine speed to or below the limitation canceling engine speed, and it takes a predetermined second period for the engine speed control section to reduce the engine speed to or below the reduction canceling engine speed, wherein the disconnection control section cancels the forcible disconnection of the driving force when a vehicle speed reaches or surpasses a predetermined limitation canceling vehicle speed in the disconnection state or when the first period has elapsed, and wherein the disconnection control section cancels the engine speed reduction control by the engine speed control section when the engine speed falls to or below the reduction canceling engine speed or when the second period has elapsed.

8. The drive control apparatus according to claim 4, wherein, in a case where the connection determining section determines switching to the connection state, if the engine speed determined by the engine speed determining section reaches or surpasses the limitation engine speed before a predetermined period elapses from the point in time of the determination of switching, the disconnection control section forcibly disconnects the transmission of the driving force.

9. The drive control apparatus according to claim 4, wherein, in a case where the connection determining section determines switching to the connection state, if the engine speed determined by the engine speed determining section reaches or surpasses the limitation engine speed before the vehicle speed reaches a predetermined vehicle speed from the point in time of the determination of switching, the disconnection control section forcibly disconnects the transmission of the driving force.

10. The drive control apparatus according to claim 4, wherein a limitation canceling engine speed is set lower than the limitation engine speed, wherein the drive control apparatus further comprises an engine speed control section that reduces the engine speed to or below the limitation canceling engine speed when the disconnection control section disconnects the driving force, wherein it takes a predetermined period for the engine speed control section to reduce the engine speed to or below the limitation canceling engine speed, and wherein the disconnection control section cancels the forcible disconnection of the driving force when the engine speed falls to or below the limitation canceling engine speed or when the predetermined period has elapsed.

11. The drive control apparatus according to claim 4, wherein the forklift further includes an acceleration section that instructs acceleration of the vehicle body, a limitation canceling engine speed being set lower than the limitation engine speed, and wherein the disconnection control section cancels the forcible disconnection of the driving force when any of the following takes place: after the driver performs an OFF operation of the acceleration section for not instructing acceleration of the vehicle body, an ON operation of the acceleration section is performed for instructing acceleration again; the engine speed falls to or below the limitation canceling engine speed; and the connection state is switched to the disconnection state in response to an operation by the driver.

12. A drive control apparatus for a forklift, wherein the forklift includes a vehicle body, a drive wheel provided to the vehicle body, an engine, a power transmission mechanism interposed between the engine and the drive wheel, and a loading attachment that is provided at a front portion of the vehicle body and mounts a load, wherein the power transmission mechanism is switchable between a connection state for transmitting power of the engine to the drive wheel and a disconnection state for not transmitting the power of the engine to the drive wheel, wherein the forklift travels using the power of the engine as a driving force, the drive control apparatus comprising:

a connection determining section that determines whether the power transmission mechanism is switched from the disconnection state to the connection state in response to an operation by a driver;

an engine speed determining section for determining an engine speed, wherein a limitation engine speed is set higher than at least an idle speed of the engine, and a disconnection control section, wherein, in a case where the connection determining section determines switching to the connection state, if the engine speed determined by the engine speed determining section is equal to or greater than the limitation engine speed, the disconnection control section forcibly disconnects the transmission of the driving force to the drive wheel.

13. The drive control apparatus according to claim 12, wherein a limitation canceling engine speed is set lower than the limitation engine speed, wherein the drive control apparatus further comprises an engine speed control section that reduces the engine speed to or below the limitation canceling engine speed when the disconnection control section disconnects the driving force, wherein it takes a predetermined period for the engine speed control section to reduce the engine speed to or below the limitation canceling engine speed, and wherein the disconnection control section cancels the forcible disconnection of the driving force when the engine speed falls to or below the limitation canceling engine speed or when the predetermined period has elapsed.

14. The drive control apparatus according to claim 12, wherein the forklift further includes an acceleration section that instructs acceleration of the vehicle body, a limitation canceling engine speed being set lower than the limitation engine speed, and wherein the disconnection control section cancels the forcible disconnection of the driving force when any of the following takes place: after the driver performs an OFF operation of the acceleration section for not instructing acceleration of the vehicle body, an ON operation of the acceleration section is performed for instructing acceleration again; the engine speed falls to or below the limitation canceling engine speed; and the connection state is switched to the disconnection state in response to an operation by the driver.

15. The drive control apparatus according to claim 12, wherein a limitation canceling engine speed is set lower than the limitation engine speed, and a reduction canceling engine speed is set lower than the limitation canceling engine speed, wherein the drive control apparatus further comprises an engine speed control section that reduces the engine speed to or below the limitation canceling engine speed when the disconnection control section disconnects the driving force, wherein it takes a predetermined first period for the engine speed control section to reduce the engine speed to or below the limitation canceling engine speed, and it takes a predetermined second period for the engine speed control section to reduce the engine speed to or below the reduction canceling engine speed, wherein the disconnection control section cancels the forcible disconnection of the driving force when the engine speed falls to or below the limitation canceling engine speed in the disconnection state or when the first period has elapsed, and wherein the disconnection control section cancels the engine speed reduction control by the engine speed control section when the engine speed falls to or below the reduction canceling engine speed or when the second period has elapsed.

16. The drive control apparatus according to claim 12, wherein a limitation canceling engine speed is set lower than the limitation engine speed, wherein the disconnection control section cancels the forcible disconnection of the driving force when a vehicle speed reaches or surpasses a predetermined limitation canceling vehicle speed in the disconnection state or when the engine speed falls to or below the limitation canceling engine speed.

17. The drive control apparatus according to claim 12, wherein a limitation canceling engine speed is set lower than the limitation engine speed, and a reduction canceling engine speed is set lower than the limitation canceling engine speed, wherein the drive control apparatus further comprises an engine speed control section that reduces the engine speed to or below the limitation canceling engine speed when the disconnection control section disconnects the driving force, wherein it takes a predetermined first period for the engine speed control section to reduce the engine speed to or below the limitation canceling engine speed, and it takes a predetermined second period for the engine speed control section to reduce the engine speed to or below the reduction canceling engine speed, wherein the disconnection control section cancels the forcible disconnection of the driving force when a vehicle speed reaches or surpasses a predetermined limitation canceling vehicle speed in the disconnection state or when the first period has elapsed, and wherein the disconnection control section cancels the engine speed reduction control by the engine speed control section when the engine speed falls to or below the reduction canceling engine speed or when the second period has elapsed.

18. The drive control apparatus according to claim 12, wherein, in a case where the connection determining section determines switching to the connection state, if the engine speed determined by the engine speed determining section reaches or surpasses the limitation engine speed before a predetermined period elapses from the point in time of the determination of switching, the disconnection control section forcibly disconnects the transmission of the driving force.

19. The drive control apparatus according to claim 12, wherein, in a case where the connection determining section determines switching to the connection state, if the engine speed determined by the engine speed determining section reaches or surpasses the limitation engine speed before the vehicle speed reaches a predetermined vehicle speed from the point in time of the determination of switching, the disconnection control section forcibly disconnects the transmission of the driving force.

20. The drive control apparatus according to claim 12, wherein the power transmission mechanism includes a clutch, wherein the vehicle body further includes a drive instructing section that instructs a driving direction of the vehicle body in response to an operation by the driver, an inching operation section that continuously changes the state of the clutch between engagement and disengagement in response to an operation by the driver, and a braking operation section that applies braking force to the vehicle body in response to an operation by the driver, wherein the drive instructing section is configured to be capable of selectively instructing any one of an advancing state, a reversing state, and non-driving state where the drive instructing section neither the advancing state nor the reversing state, wherein, when the drive instructing section is operated to instruct the advancing state or the reversing state from the non-driving state, the disconnection state is switched to the connection state, wherein, when an ON operation of the inching operation section is performed, the clutch is actuated to be disengaged, when an OFF operation of the inching operation section is performed, the clutch is actuated to be engaged, and wherein the inching operation section is operated from the ON operation to the OFF operation, the disconnection state is switched to the connection state, wherein, when an ON operation of the braking operation section is performed, the braking force is applied, when an OFF operation of the braking operation section is performed, the braking force is not applied, and wherein the braking operation section is operated from the ON operation to the OFF operation, the disconnection state is switched to the connection state, and wherein the connection determining section determines whether switching to the connection state has been performed based on the operating state of at least one of the drive instructing section, the inching operation section, and the braking operation section.

21. The drive control apparatus according to claim 12, wherein the power transmission mechanism includes a hydraulic clutch having a pressure receiving chamber, the clutch is continuously changed between engagement and disengagement in accordance with a hydraulic pressure in the pressure receiving chamber, wherein the clutch is provided with a hydraulic pressure detecting section for detecting the hydraulic pressure in the pressure receiving chamber, and wherein the connection determining section determines whether switching to the connection state has been performed based on the hydraulic pressure detected by the hydraulic pressure detecting section.

* * * * *

UNITED STATES PATENT AND TRADEMARK OFFICE
CERTIFICATE OF CORRECTION

PATENT NO. : 7,524,268 B2  Page 1 of 1
APPLICATION NO. : 11/541290
DATED : April 28, 2009
INVENTOR(S) : Hidenori Oka et al.

It is certified that error appears in the above-identified patent and that said Letters Patent is hereby corrected as shown below:

Column 11, line 13, please delete "when the tilt angle is but" and insert -- when the tilt angle is out --;

Column 23, line 22, please delete "sa" and insert -- Sa --; and

Column 29, line 64, please delete "till" and insert -- t11 --.

Signed and Sealed this

Twenty-fourth Day of November, 2009

David J. Kappos
*Director of the United States Patent and Trademark Office*